(12) United States Patent
Shibata et al.

(10) Patent No.: US 10,288,467 B2
(45) Date of Patent: May 14, 2019

(54) CAPACITANCE MEASUREMENT DEVICE, CAPACITANCE-TYPE SHEET-SHAPED SENSOR APPARATUS, AND CAPACITANCE-TYPE LIQUID-LEVEL DETECTOR APPARATUS

(71) Applicant: Sumitomo Riko Company Limited, Aichi (JP)

(72) Inventors: Tetsuyoshi Shibata, Aichi (JP); Ichinosuke Maeda, Aichi (JP); Yuki Saito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 334 days.

(21) Appl. No.: 15/003,979

(22) Filed: Jan. 22, 2016

(65) Prior Publication Data

US 2016/0202104 A1 Jul. 14, 2016

Related U.S. Application Data

(63) Continuation of application No. PCT/JP2015/050639, filed on Jan. 13, 2015.

(51) Int. Cl.
*G01F 23/26* (2006.01)
(52) U.S. Cl.
CPC .......... *G01F 23/265* (2013.01); *G01F 23/266* (2013.01); *G01F 23/268* (2013.01)
(58) Field of Classification Search
CPC .... G01F 23/266; G01F 23/263; G01F 23/268; G01R 27/2605; G06K 9/0002; G01D 5/24

(Continued)

(56) References Cited

U.S. PATENT DOCUMENTS 5,661,240 A * 8/1997 Kemp ................. G01D 5/2417
324/658
7,836,762 B2 * 11/2010 Gamberini ............. G01G 17/00
73/304 C (Continued)

FOREIGN PATENT DOCUMENTS

JP 48-31979 4/1973
JP 2561040 12/1996

(Continued)

OTHER PUBLICATIONS

Definitions.net, STANDS4 LLC, 2012, Web, Jun. 28, 2012.*

(Continued)

*Primary Examiner* — John Fitzgerald
*Assistant Examiner* — Truong D Phan
(74) *Attorney, Agent, or Firm* — Greenblum & Bernstein, P.L.C.

(57) ABSTRACT

A capacitance measurement device includes a bridging capacitor connected in series to another one of the opposite end sides of a measurement-objective capacitance, and a charging/discharging switching element connected in series to the other one of the opposite end sides of the measurement-objective capacitance, and connected in parallel to the bridging capacitor. The measurement-objective capacitance is discharged when the charging/discharging switching element is turned to the closed state, and is charged when the charging/discharging switching element is turned to the opened state. A gauge gains an equivalent value for the measurement-objective capacitance, based on a potential at the other one of the opposite end sides of the measurement-objective capacitance, at the time of the charging step.

8 Claims, 20 Drawing Sheets

(58) Field of Classification Search
USPC .............. 73/304 C, 658, 668–682; 345/174
See application file for complete search history.

(56) References Cited

U.S. PATENT DOCUMENTS

| | | | |
|---|---|---|---|
| 7,924,029 B2* | 4/2011 | Reynolds | H03K 17/955 324/672 |
| 8,829,928 B2* | 9/2014 | Gonzalez | G01N 1/12 324/658 |
| 2007/0159184 A1* | 7/2007 | Reynolds | H03K 17/955 324/662 |
| 2007/0279021 A1* | 12/2007 | Yanagida | H02M 3/07 323/272 |
| 2008/0088262 A1* | 4/2008 | Bolz | F02D 41/2096 318/116 |
| 2010/0073323 A1 | 3/2010 | Geaghan | |
| 2010/0171551 A1* | 7/2010 | Garcia Gonzalez | H03F 1/42 330/109 |
| 2011/0057916 A1* | 3/2011 | Cheng | G09G 3/344 345/211 |
| 2011/0079078 A1* | 4/2011 | Ho | G01F 23/268 73/304 C |
| 2011/0234244 A1* | 9/2011 | Chambon | A47J 37/1266 324/663 |
| 2013/0082970 A1* | 4/2013 | Frey | G06F 3/0414 345/173 |
| 2013/0160531 A1 | 6/2013 | Kato | |
| 2015/0346907 A1* | 12/2015 | Nakajima | G06F 3/044 345/174 |
| 2016/0033343 A1* | 2/2016 | Park | G01L 1/205 73/862.046 |
| 2016/0041021 A1* | 2/2016 | Saitou | G01F 23/26 73/304 C |

FOREIGN PATENT DOCUMENTS

| | | |
|---|---|---|
| JP | 11-311562 | 11/1999 |
| JP | 3379388 | 2/2003 |
| JP | 2005-030901 | 2/2005 |
| JP | 2006-337173 | 12/2006 |
| JP | 2012-503774 | 2/2012 |
| JP | 2013-134210 A | 7/2013 |
| WO | 2011/004727 | 1/2011 |
| WO | 2011/125725 | 10/2011 |

OTHER PUBLICATIONS

Definitions.net, STANDS4 LLC, 2009, Jan. 25, 2009.*
International Search Report from PCT/JP2015/050639, dated Apr. 14, 2015.
Japanese Office Action issued in the Japanese Patent Application No. 2013-190218 dated Mar. 21, 2017 along with a partial English language translation.
First Office Action in corresponding Chinese Patent Application No. 201580029994.2 and English translation thereof, dated Aug. 2, 2018.

* cited by examiner

CAPACITANCE MEASUREMENT DEVICE, CAPACITANCE-TYPE SHEET-SHAPED SENSOR APPARATUS, AND CAPACITANCE-TYPE LIQUID-LEVEL DETECTOR APPARATUS

CROSS REFERENCE TO RELATED APPLICATIONS

The present application is a Continuation Application of International Application No. PCT/JP2015/050639, filed on Jan. 13, 2015, which is incorporated herein by reference.

BACKGROUND OF THE INVENTION

1. Field of the Invention

The present invention relates to a capacitance measurement device, and to a capacitance-type planar sensor apparatus and capacitance-type liquid-level detector apparatus that use the measurement device.

2. Description of the Related Art

A device, which judges whether or not a change in capacity to be measured arises from an event making an object to be detected, is set forth in International Publication No. 2011/004727 (or Patent Literature No. 1) The device is equipped with: a first switch, which serially connects a reference capacity "Cs" with respect to a capacity "Cx1" to be measured to a first potential source "V1" side and one of whose opposite ends is put in place between the opposite ends of the reference capacity connected to the first potential source "V1"; a second switch, one of whose opposite ends is put in place between another one of the opposite ends of the to-be-measured capacity connected to a second potential source or a free space and another one of the opposite ends of said reference capacity; and a third switch, which is put in place between the opposite ends of said to-be-measured capacity.

And, a number of repetitive operations until the potential between the terminals of the reference capacity "Cs" changes to a set-up potential "Vref" is counted when an operation to turn the second switch to the closed state and another operation to turn the third switch to the closed state are repeated alternately after a first-switch operation that turns the first switch to the closed state and then turns it to the opened state. And, whether or not a change in the to-be-measured capacity arises from an event making an object to be measured is judged based on the respective number of repetitive operations ("N1," "N2") when varying a time for carrying out the second-switch operation.

Moreover, opposing multiply-lined electrodes to multiply-columned electrodes to measure the respective capacitances at the matrix-shaped measurement-objective positions is set forth in Japanese Unexamined Patent Publication (KOKAI) Gazette No. 2005-30901 (or Patent Literature No. 2). The device measures the capacitances by measuring a current, which flows to one of the capacitances at the measurement-objective positions, when outputting a pulsating signal to another one of the capacitances thereat.

Moreover, measurement devices for capacitance are set forth in Japanese Patent Gazette No. 3379388 (or Patent Literature No. 3), Japanese Patent Gazette No. 2561040 (or Patent Literature No. 4), International Publication No. 2011/125725 (or Patent Literature No. 5), and so on. Moreover, devices using capacitances to detect liquid levels are set forth in Japanese Unexamined Patent Publication (KOKAI) Gazette No. 11-311562 (or Patent Literature No. 6), and Japanese Unexamined Patent Publication (KOKAI) Gazette No. 2006-337173 (or Patent Literature No. 7).

SUMMARY OF THE INVENTION

Incidentally, it has been common heretofore that the measurement of capacitance is carried out by measuring a current flowing to one of the opposite sides of the capacitance when applying an alternating voltage to another one of the opposite sides of the capacitance. However, when measuring a capacitance based on such a current value, since the current value has become a small value, the capacitance cannot be measured highly accurately due to the fact that it is affected by noises.

Moreover, in a case where another predetermined capacitance is connected in series to a measurement-objective capacitance and then a constant voltage is applied to it, it is feasible to calculate the measurement-objective capacitance by measuring a potential between the capacitances. That is, a measurement object in this instance is not a current value, but a voltage value. However, since the potential between the two capacitances is indefinite, the capacitance measured using the potential between the capacitances is not a highly accurate one. Moreover, the above-described conventional techniques lead to very complicated measurement devices.

Moreover, in the device set forth in Patent Literature No. 5, since it takes a time until electricity is stored in the capacitor "C1," it is not easy to measure a measurement-objective capacitance at a fast rate.

It is an object of the present invention to intend to make the rate of a measurement faster rate and upgrade the noise resistance by employing a method of measuring a potential between a capacitance and another predetermined capacitance, the former making a measurement object and the latter connected to the former in series; and additionally to provide a capacitance measurement device that can measure the measurement-objective capacitance highly accurately even when measuring a potential between the capacitances.

Moreover, it is another object thereof to provide a capacitance-type planar sensor apparatus and capacitance-type liquid-level detector apparatus that use the measurement device. Specifically, the other object is to provide a capacitance-type planar sensor device and capacitance-type liquid-level detector apparatus that can measure a measurement-objective capacitance at a fast rate and with high accuracy.

Capacitance Measurement Device

Hence, the present inventors discovered the following: setting a state where a potential between two capacitances is discharged to a ground potential as a reference state makes it feasible to measure a measurement-objective capacitance by measuring the potential between the two capacitances.

Specifically, a capacitance measurement device directed to one of the present means comprises:

an input-voltage device applying a constant-voltage input voltage to one of opposite end sides of a measurement-objective capacitance;

a bridging capacitor connected in series to another one of the opposite end sides of the measurement-objective capacitance, and connecting the other one of the opposite end sides of the measurement-objective capacitance with a ground potential between the two;

a charging/discharging switching element connected in series to the other one of the opposite end sides of the measurement-objective capacitance, and connected in parallel to the bridging capacitor, thereby discharging a charge on the other one of the opposite end sides of the measurement-objective capacitance to the ground potential at the time of a closed state thereof;

a controller executing the following steps:

a step of turning the input-voltage application device to a state of not applying the input voltage, and turning the charging/discharging switching element to a closed state thereof, thereby discharging the charge on the measurement-objective capacitance to the ground potential; and a step of turning the charging/discharging switching element to an opened state thereof, and turning the input-voltage application device to a state of applying the input voltage, after the discharging step, thereby charging the measurement-objective capacitance; and a gauge gaining an equivalent value for the measurement-objective capacitance based on a potential between the measurement-objective capacitance and the bridging capacitor in the charging step executed by the controller.

The bridging capacitor is connected in series to the measurement-objective capacitance, and the gauge gains an equivalent value for the capacitance based on the potential (or an intermediate potential) between the measurement-objective capacitance and the bridging capacitor, namely, a potential at the other one of the opposite end sides of the measurement-objective capacitance. Note herein that, since an intermediate potential between two capacitors is indefinite, a capacitance measured using the intermediate potential is not a highly accurate one.

However, turning the charging/discharging switching element to the closed state leads to discharging the charge on the measurement-objective capacitance. Specifically, the aforementioned intermediate potential becomes a ground potential. And, this state is set to be a reference state. That is, the intermediate potential in the reference state is equal to the ground potential. In other words, it is possible to carry out a calibration of the intermediate potential by turning the charging/discharging switching element to the closed state.

And, the gauge measures a potential at the other one of the opposite ends sides of the measurement-objective capacitance when the charging/discharging switching element is turned to the opened state and the input voltage is turned to a state of being input after the charge on the measurement-objective capacitance has been discharged. That is, the potential, which the gauge measures, is a potential that accords with the measurement-objective capacitance. Therefore, the measurement device according to the present means can measure the measurement-objective capacitance highly accurately.

In addition, since the aforementioned means is a technique of measuring the capacitance using the intermediate potential, it becomes less likely to be affected by noises compared with the case of current measurement, and thereby a highly accurate measurement of the capacitance becomes feasible. In addition, being a measurement using the intermediate potential makes a fast-rate measurement feasible. Moreover, it is possible to carry out the calibration, in which the charging/discharging switching element is turned to the closed state, in a short period of time. Also because of this, a fast-rate measurement of the capacitance becomes feasible as a whole.

Hereinafter, explanations will be made as to some of suitable modes of the capacitance measurement device directed to the present means.

The input-voltage application device can preferably include:

a constant-voltage power source capable of applying the input voltage; and a first-inputting switching element connected at one of opposite end sides thereof to the one of the opposite end sides of the measurement-objective capacitance, connected at another one of the opposite end sides thereof to one of the constant-voltage power source and the ground potential, and switching back and forth between a state where the constant-voltage power source applies the input voltage to the measurement-objective capacitance and another state where the constant-voltage power source does not apply the input voltage to the measurement-objective capacitance.

Thus, the intermediate potential can be securely turned to the reference-state potential, and the state of applying the input voltage to the measurement-objective capacitance can be formed reliably. As a result, a highly accurate equivalent value for the capacitance is gainable.

Moreover, the capacity measurement device can preferably further comprise a second capacitor having an opposite end side to which a constant-voltage second input voltage is applied, and another opposite end side connected to the other one of the opposite end sides of the measurement-objective capacitance.

Thus, an equivalent value with higher accuracy is gainable for the measurement-objective capacitance.

Moreover, the capacitance measurement device can preferably switch states thereof in the following order:

a first state of not inputting both of the input voltage and the second input voltage;

a second state of inputting one of the input voltage and the second input voltage but not inputting another one of them;

a third state of inputting both of the input voltage and the second input voltage; and a fourth state of not inputting the one of the input voltage and the second input voltage but inputting the other one of them;

wherein the gauge gains an equivalent value for the measurement-objective capacitance based on a potential at the other one of the opposite end sides of the measurement-objective capacitance in the second state, the third state or the fourth state.

Thus, an equivalent value with much higher accuracy is obtainable securely for the measurement-objective capacitance.

Moreover, a capacitance of the bridging capacitor can preferably be set to be a larger capacitance than a capacitance between the ground potential and the other one of the opposite end sides of the measurement-objective capacitance.

Thus, an affection extent of the capacitance, which exists between the ground potential and the other one of the opposite end sides of the measurement-objective capacitance, becomes smaller reliably. Therefore, an equivalent value with much higher accuracy is obtainable for the measurement-objective capacitance.

Moreover, the capacitance measurement device can preferably gain each of equivalent values for multiple measurement-objective capacitances in a sensor body thereof; and an equivalent circuit of the sensor body can include multiple lines of first electrodes, multiple columns of second electrodes to be put in place so as to make a matrix shape to the multiply-lined first electrodes, and multiple dielectric layers disposed at multiple positions at which the multiply-lined first electrodes and the multiply-columned second electrodes intersect one another three-dimensionally;

wherein the equivalent values for the multiple measurement-objective capacitances in the sensor body are equivalent values for capacitances between the first electrodes and the second electrodes that correspond to the respective positions in the multiple dielectric layers.

That is, in the equivalent circuit, the multiple measurement-objective capacitances are put in place in a matrix shape. And, using the above-described capacitance measurement device makes each of the equivalent values for each of the matrix-shaped measurement-objective capacitances obtainable highly accurately.

Moreover, the gauge can preferably solve simultaneous equations expressed by the following:

respective voltages at the second electrodes, which are selected when the input voltage is applied to one of the first electrodes of the multiply-lined first electrodes and the other remaining first electrodes are connected to the ground potential; and capacitances taken as unknown quantities, and exhibited at multiple positions at which the selected second electrodes intersect each of the multiply-lined first electrodes three-dimensionally;

whereby the gauge gains equivalent values for the respective capacitances taken as the unknown quantities in the simultaneous equations.

When measuring a potential at the other one of the opposite end sides of one of the measurement-objective capacitances, there might possibly arise such a case where the measurement is affected by the other capacitances. Hence, the gauge solves, as set forth above, the simultaneous equations, in which the multiple measurement-objective capacitances are taken unknown quantities, and which are expressed by the respective measurement-objective capacitances and the capacitances having an influence on the measurement-objective capacitances. Therefore, equivalent values are obtainable highly accurately for the respective capacitances, which are taken as the unknown quantities in the simultaneous equations.

Capacitance-Type Planar Sensor Apparatus

Next, explanations will be made as to a capacitance-type planar sensor apparatus using the above-described capacitance measurement device.

A capacitance-type planar sensor apparatus directed to the present means comprises:

multiply-lined first electrodes formed as a strip shape, and put in place to be parallel mutually;

multiply-columned second electrodes formed as a strip shape, and put in place to be parallel mutually, the multiply-columned second electrodes whose opposing positions to the multiply-lined first electrodes are disposed to oppose to the first electrodes so as to make a matrix shape;

a dielectric layer disposed between each of the first electrodes in the multiply-lined first electrodes and each of the second electrodes in the multiply-columned second electrodes; and the above-described capacitance measurement device gaining an equivalent value for a capacitance at each of matrix-shaped positions corresponding to an opposing position of each of the first electrodes to each of the second electrodes;

wherein the first electrodes make the one of the opposite end sides of the measurement-objective capacitance; and the second electrodes make the other one of the opposite end sides of the measurement-objective capacitance.

The planar sensor apparatus comes to exhibit multiple measurement-objective capacitances that are put in place in a matrix shape. In this instance, using the above-described capacitance measurement device leads to making an equivalent value obtainable highly accurately for each of the matrix-shaped measurement-objective capacitances.

Hereinafter, explanations will be made as to some of suitable modes of the capacitance-type planar sensor apparatus directed to the present means.

The capacitance-type planar sensor apparatus can preferably further comprise a third electrode disposed so as to oppose to the second electrodes on an opposite side with respect to the first electrodes, and connected to the ground potential; and a capacitor formed of the second electrodes and the third electrode can make the bridging capacitor.

The third electrode comes to be applicable as one of the opposite electrodes of the bridging capacitor. Therefore, the construction becomes simplified.

The capacitance-type planar sensor apparatus can preferably further comprise: a third electrode disposed so as to oppose to the second electrodes on an opposite side with respect to the first electrodes;

the capacitance measurement device can further comprise a second capacitor having an opposite end side to which a constant-voltage second input voltage is applied, and another opposite end side connected to the other one of the opposite end sides of the measurement-objective capacitance; and a capacitor formed of the second electrodes and the third electrode can constitute the second capacitor.

Since the capacitor, which is formed of the second electrodes and third electrode, constitutes the second capacitor, no single-purpose or dedicated second capacitor becomes necessary.

Capacitance-Type Liquid-Level Detector Apparatus

Next, explanations will be made as to a capacitance-type liquid-level sensor apparatus using the above-described capacitance measurement device.

A capacitance-type liquid-level sensor apparatus directed to the present means comprises:

multiple electrodes put in place in a displaced manner in a height direction thereof within a tank storing liquid;

the above-described capacitance measurement device gaining an equivalent value for a capacity between two electrodes selected from among the multiple electrodes as the equivalent value for the measurement-objective capacitance; and a judgment unit judging a liquid level within the tank based on the equivalent value for the measurement-objective capacitance.

Using the above-described capacitance measurement device leads to making an equivalent value obtainable highly accurately for each of the matrix-shaped measurement-objective capacitances. Therefore, a liquid level with high accuracy is obtainable.

Hereinafter, explanations will be made as to some of suitable modes of the capacitance-type liquid-level detector apparatus directed to the present means.

The judgment unit can preferably judge a liquid quality based on the equivalent value for the measurement-objective capacitance.

Thus, the capacitance becomes a value that accords with a liquid quality. Therefore, the liquid quality of liquid within the tank is obtainable highly accurately.

The capacitance measurement device can preferably, further comprise a second capacitor having an opposite end side to which a constant-voltage second input voltage is applied, and another opposite end side connected to the other one of the opposite end sides of the measurement-objective capacitance;

a capacitor, which is formed of the measurement-objective two electrodes, one of which is located on a lower side and another one of which is located on a much lower side, can constitute the second capacitor; and the judgment unit can judge a boundary between different species of liquids based on the equivalent value for the measurement-objective capacitance.

Comparing the capacitances between the electrodes that neighbor one another in the height direction results in understanding that the same kind of liquids exist when the capacitances agree with each other, and in understanding that liquids distinct to each other exist when they differ from each other. Therefore, when different kinds of liquids exist, a boundary between them is obtainable highly accurately.

BRIEF DESCRIPTION OF THE DRAWINGS

FIG. 12 is taken out therefrom;

DETAILED DESCRIPTION OF THE PREFERRED EMBODIMENTS

Capacitance Measurement Device According to First Embodiment

Figure 1:
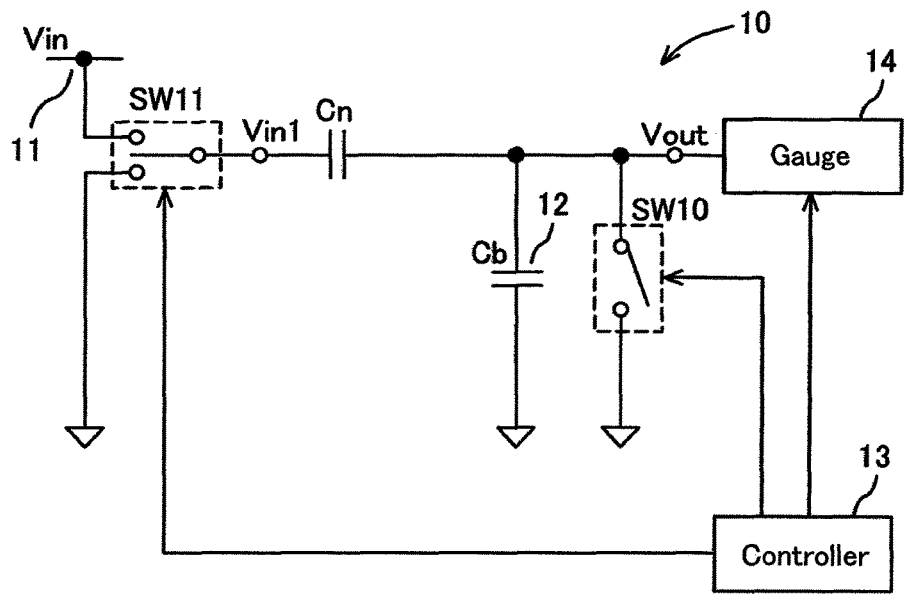
FIG. 1 illustrates a circuit construction of a capacitance measurement device 10 according to First Embodiment.

As illustrated in FIG. 1, a capacitance measurement device 10 in First Embodiment is a device that measures an equivalent value for a measurement-objective capacitance "Cn." The capacitance measurement device 10 comprises a constant-voltage power source 11, a switching element SW11 for first inputting, a bridging capacitor 12, a charging/discharging switching element SW10, a controller 13, and a gauge 14.

The constant-voltage power source 11 (i.e., a constituent of an input-voltage application device) is a power source that is capable of applying a constant-voltage input voltage "Vin." The first-inputting switching element SW11 (i.e., another constituent of the input-voltage application device) has an opposite end side connected to one of the opposite end sides of a measurement-objective capacitance "Cn," and another opposite end side connected switchably to one of the constant-voltage power source 11 and a ground potential. That is, when the first-inputting switching element SW1 is connected to a side of the constant-voltage power source 11, the input voltage "Vin" turns to be a state of being applied to the one of the opposite end sides of the measurement-objective capacitance "Cn." On the other hand, when the first-inputting switching element SW1 is connected to a side of the ground potential, the input voltage "Vin" turns to be a state of not being applied to the one of the opposite end sides of the measurement-objective capacitance "Cn."

The bridging capacitor 12 is connected in series to another one of the opposite end sides of the measurement-objective capacitance "Cn" (namely, to a distinct or opposite side to the constant-voltage power source 11), and connects the other one of the opposite end sides of the measurement-objective capacitance "Cn" with the ground potential between the two. That is, the measurement-objective capacitance "Cn," and the bridging capacitance 12 constitute a bridge circuit. Note herein that the bridging capacitor 12 has a capacitance "Cb."

The charging/discharging switching element SW10 is connected not only to the other one of the opposite end sides of the measurement-objective capacitance "Cn" in series, but also to the bridging capacitor 12 in parallel. In addition, the charging/discharging switching element SW10 discharges a charge on the other of the opposite end sides of the measurement-objective capacitance "Cn" to the ground potential at a time of the closed state.

The controller 13 executes a discharging step and a charging step, which are described below, alternately. Specifically, the controller 13 turns the first-inputting switching element SW11 to a state of being connected to the ground-potential side, and turns the charging/discharging switching element SW11 to the closed state, thereby discharging the charge on the other one of the opposite end sides of the measurement-objective capacitance "Cn" to the ground potential (i.e., the discharging step). Note herein that the state of connecting the first-inputting switching element SW11 to the ground-potential side is equivalent to the state of not applying the input voltage "Vin" to the measurement-objective capacitance "Cn." The aforementioned discharging step sets up the charge on the measurement-objective capacitance "Cn" at the ground potential serving as a reference state, and thereby it is possible to carry out a calibration.

Moreover, after the aforementioned discharging step, the controller 13 turns the first-inputting switching element SW11 to a state of being connected to a side of the constant-voltage power source 11, and turns the charging/discharging switching element SW10 to the opened state, thereby charging the measurement-objective capacitance "Cn" (i.e., the charging step). Note herein that the state of connecting the first-inputting switching element SW11 to the side of the constant-voltage power source 11 is equivalent to the state of applying the input voltage "Vin" to the measurement-objective capacitance "Cn."

When the controller 13 executes the charging step, the gauge 14 gains an equivalent value for the capacitance of a measurement objective based on a potential "Vout" (hereinafter being also referred to as an "output voltage") between the measurement-objective capacitance "Cn" and the bridging capacitor 12. Note that the output voltage "Vout" is equivalent to a potential at the other one of the opposite end sides of the measurement-objective capacitance "Cn."

Note herein that the measurement-objective capacitance "Cn," the capacitance "Cb" of the bridging capacitor 12, the input voltage "Vin" and the output voltage "Vout" exhibit a relationship according to Equation (1).

(Mathematical Formula 1)

$$Cn = \frac{Cb \times Vout}{Vin - Vout} \qquad (1)$$

Moreover, the capacitance "Cb" of the bridging capacitor 12, and the input voltage "Vin" are known. Therefore, the gauge 14 can gain an equivalent value for the measurement-objective capacitance "Cn" by Equation (1) based on the output voltage "Vout."

Figure 2:
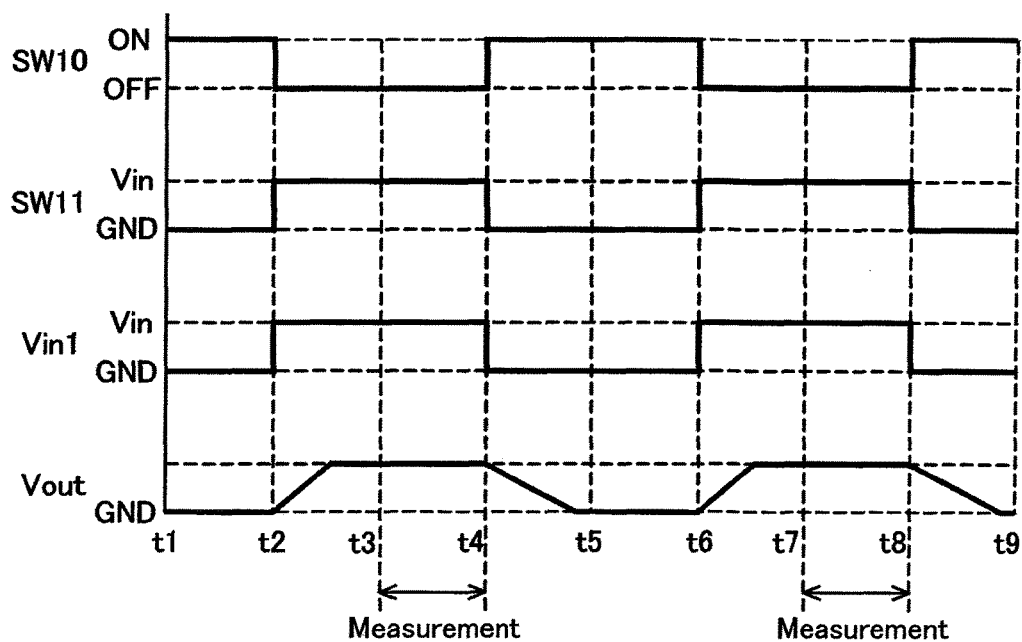
FIG. 2 is a timing chart for the activation or actions of switching devices (SW10, SW11), a potential "Vin1" at one of the opposite end sides of a measurement-objective capacitance "Cn," and an output voltage "Vout" in First Embodiment.

Next, with reference to FIG. 2, explanations are made as to relationships between the opening/closing timing of the charging/discharging switching element SW10 that the controller 13 executes, the potential "Vin1" at the one of the opposite end sides of the measurement-objective capacitance "Cn," and the output voltage "Vout." Between "t1" and "t2," the charging/discharging switching element SW10 is turned to "ON" (i.e., the closed state). Moreover, the first-inputting switching element SW11 is connected to the ground-potential side. Therefore, the potential "Vin1" at the one of the opposite end sides of the measurement-objective capacitance "Cn" becomes the ground potential.

The aforementioned actions or operations discharge the charge on the measurement-objective capacitance "Cn" by way of the charging/discharging switching element SW10. As a result, the potential (or output voltage) "Vout" between the measurement-objective capacitance "Cn" and the bridging capacitor 12 becomes the ground potential serving as a reference state. That is, although the output voltage "Vout" has been indefinite before the aforementioned operations, the aforementioned operations set up the output voltage "Vout" at the ground potential.

Subsequently, between "t2" through "t4," the charging/discharging switching element SW10 is turned to "OFF" (i.e., the opened state), and the first-inputting switching element SW11 is connected to the side of the constant-voltage power source 11. Therefore, the potential "Vin1" at the one of the opposite end sides of the measurement-objective capacitance "Cn" becomes the input voltage "Vin." The aforementioned operations charge a charge to the measurement-objective capacitance "Cn." After a time needed for the charging has elapsed, the gauge 14 measures the output voltage "Vout." In FIG. 2, the gauge 14 measures the output voltage "Vout" between "t3" and "t4."

Subsequently, between "t4" and "t5," the charging/discharging switching element SW10 is turned to "ON" (i.e., the closed state), and the first-inputting switching element SW11 is connected to the ground-potential side. These operations make the potential "Vin1" at the one of the opposite end sides of the measurement-objective capacitance "Cn" the ground potential, and accordingly the charge on the measurement-objective capacitance "Cn" is discharged. Specifically, the aforementioned output voltage "Vout" becomes the ground potential. Subsequently, between "t5" through "t9," the same operations as the above-described operations between "t1" through "t5" are repeated.

As set forth above, the bridging capacitor 12 is connected in series to the measurement-objective capacitance "Cn," and the gauge 14 gains a capacitance equivalent value therefor based on a potential at the other one of the opposite end sides of the measurement-objective capacitance "Cn," namely, a potential between a measurement object and the bridging capacitor 12 (or the output voltage "Vout"). Note herein that, since an intermediate potential between two capacitors is indefinite, a capacitance measured using the intermediate potential is not a highly accurate one.

As being aforementioned, however, turning the charging/discharging switching element SW10 to the closed state leads to discharging the charge on the measurement-objective capacitance "Cn." Specifically, the aforementioned output voltage (or intermediate potential) "Vout" becomes the ground potential serving as a reference state. That is, turning the charging/discharging switching element SW10 to the closed state results in enabling a calibration for the output voltage "Vout" to be carried out.

And, when the charging/discharging switching element SW10 is turned to the opened state and the input voltage "Vin" is applied to the one of the opposite end sides of the measurement-objective capacitance "Cn" after the charge is discharged, the gauge 14 measures a potential at the other one of the opposite end sides of the measurement-objective capacitance "Cn." That is, the potential, which the gauge 14 measures, becomes a potential that accords with or is proportional to the measurement-objective capacitance "Cn." Therefore, the capacitance measurement device 10 can measure the measurement-objective capacitance "Cn" highly accurately.

Capacitance Measurement Device According to Second Embodiment

Figure 3:
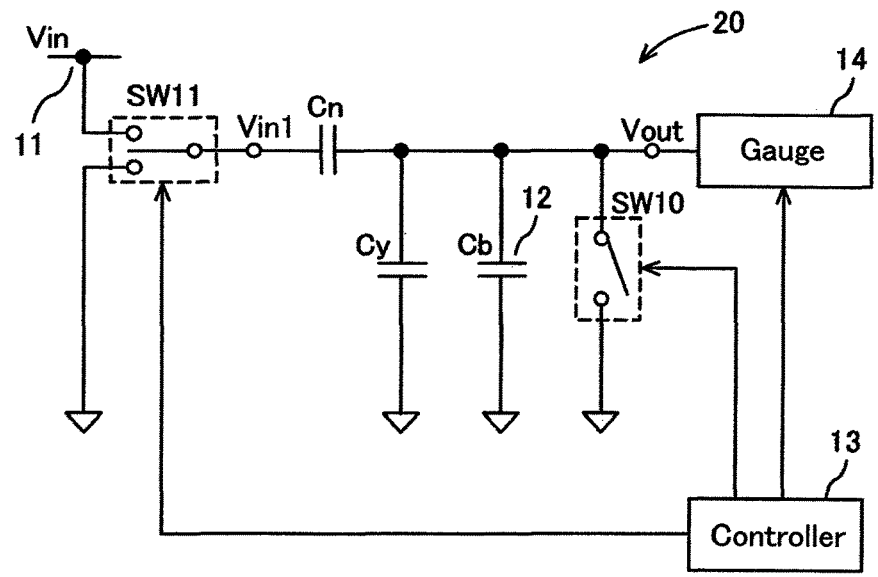
FIG. 3 illustrates a circuit construction of a capacitance measurement device 20 according to Second Embodiment.

As illustrated in FIG. 3, a capacitance measurement device 20 according to Second Embodiment comprises a power source 11, a bridging capacitor 12, a charging/discharging switching element SW10, a controller 13, and a gauge 14.

In the capacitance measurement device 20 according to Second Embodiment, a capacitance "Cy" is added to the capacitance measurement device 10 according to First Embodiment. The capacitance "Cy" is a capacitance that exists between the other one of the opposite end sides of the measurement-objective capacitance "Cn" and the ground potential. For example, the capacitance "Cy" is formed between an electrode on the other one of the opposite end sides of the measurement-objective capacitance "Cn" and another electrode that exists near the former electrode.

That is, the bridging capacitor 12 is connected in parallel to the capacitance "Cy." Note herein that the capacitance "Cb" of the bridging capacitor 12 is set up so as to be larger than the capacitance "Cy." The capacitance "Cy" can be assumed preliminarily to a certain extent. Hence, the capacitance "Cb" of the bridging capacitor 12 is set up accordingly. In particular, the capacitance "Cb" of the bridging capacitor 12 can be set up satisfactorily to be 100 times or more of the capacitance "Cy."

Note herein that the measurement-objective capacitance "Cn," the capacitance "Cb" of the bridging capacitor 12, the input voltage "Vin," the output voltage "Vout" and the capacitance "Cb" exhibit a relationship according to Equation (2).

(Mathematical Formula 2)

$$Cn = \frac{(Cb + Cy) \times Vout}{Vin - Vout} \quad (2)$$

As can be apparent from Equation (2), ("Cb"+"Cy") becomes a value approximating "Cb" when the capacitance "Cb" of the bridging capacitor 12 is fully larger than "Cy." Therefore, the measurement-objective capacitance "Cn" is derived from the relationship similar to Equation (1). Thus, the degree of influence, which results from the capacitance "Cy" between the ground potential and the other one of the opposite end sides of the measurement-objective capacitance "Cn," becomes smaller reliably. Therefore, a highly accurate equivalent value is obtainable for the measurement-objective capacitance "Cn."

Capacitance Measurement Device According to Third Embodiment

Figure 4:
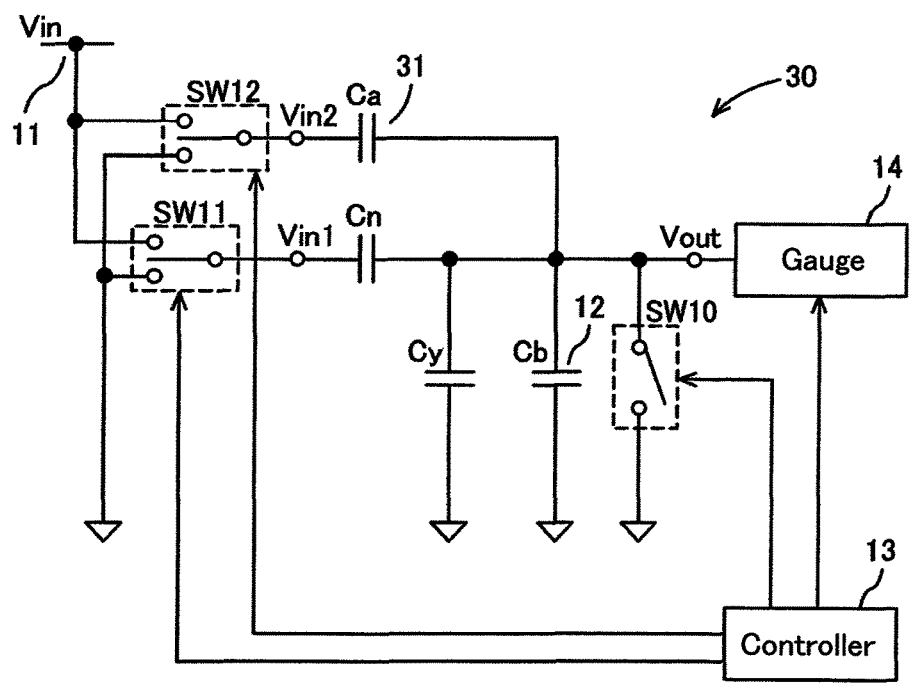
FIG. 4 illustrates a circuit construction of a capacitance measurement device 30 according to Third Embodiment.

As illustrated in FIG. 4, a capacitance measurement device 30 according to Third Embodiment comprises a constant-voltage power source 11, a bridging capacitor 12, a charging/discharging switching element SW10, a controller 13, a gauge 14, a first-inputting switching element SW11, a second capacitor 31, and a second-inputting switching element SW12.

In the capacitance measurement device 30 according to Third Embodiment, the second capacitor 31, and the second-inputting switching element SW12 are added to the capacitance measurement device 20 according to Second Embodiment. The second capacitor 31 has an opposite end side to which a constant-voltage second input voltage "Vin" (being identical with the input voltage "Vin" in the present embodiment) is applied, and another opposite end side which is connected to the other one of the opposite end sides of the measurement-objective capacitance "Cn."

The second-inputting switching element SW12 has an opposite end side which is connected to the one of the opposite end sides of the second capacitor 31, and another opposite end side which is connected switchably to one of the constant-voltage power source 11 and the ground potential. That is, when the second-inputting switching element SW12 is connected to a side of the constant-voltage power source 11, the second capacitor 31 turns to a state where the second input voltage "Vin" is applied to the one of the opposite end sides. On the other hand, when the second-inputting switching element SW12 is connected to a side of the ground potential, the second capacitor 31 turns to another state where the second input voltage "Vin" is not applied to the one of the opposite end sides.

Figure 5:
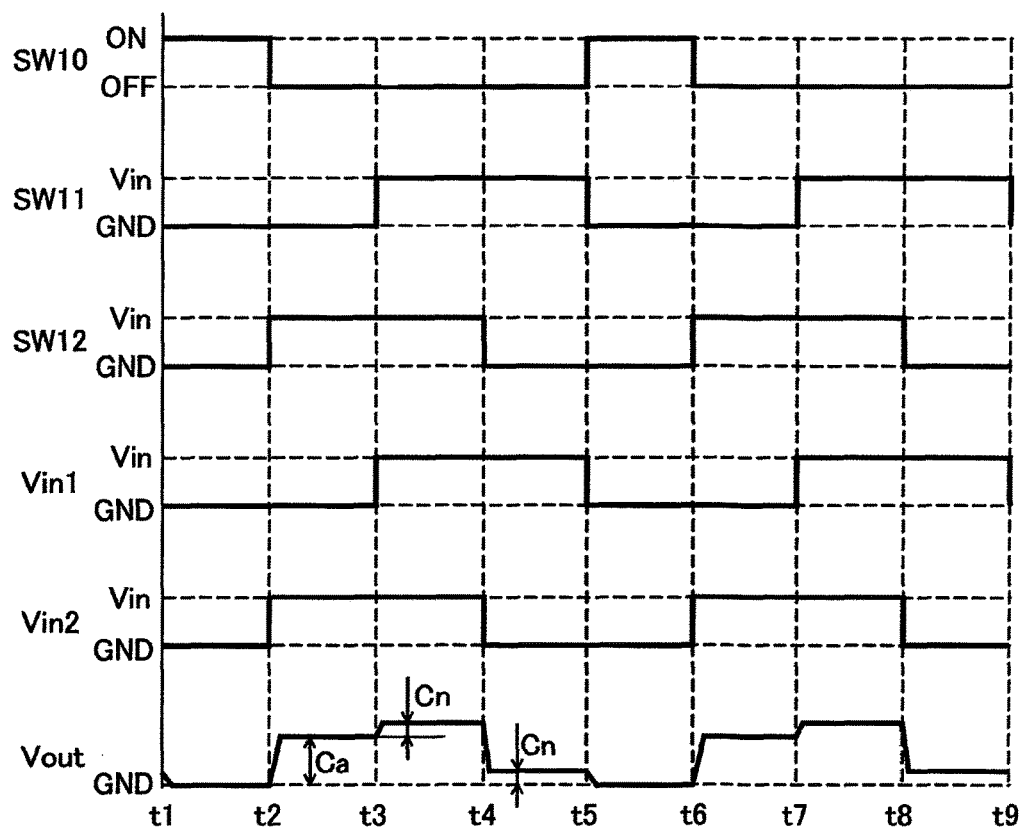
FIG. 5 is a timing chart for the activation or actions of switching devices (SW10, SW11, SW12), a potential "Vin1" at one of the opposite end sides of a measurement-objective capacitance "Cn," a potential "Vin2" at one of the opposite end sides of a second capacitor and an output voltage "Vout" in Third Embodiment.

Note herein that a relationship is as shown in FIG. 5 between the switching timing of the respective switching elements (SW10, SW11, SW12) that the controller 13 executes, the potential "Vin1" at the one of the opposite end sides of the measurement-objective capacitance "Cn," the potential "Vin2" at the one of the opposite end sides of the second capacitance 31, and the output voltage "Vout."

As illustrated in FIG. 5, the charging/discharging switching element SW10 is turned to "ON" (i.e., the closed state) between "t1" and "t2" and between "t5" and "t6"; and is turned to "OFF" (i.e., the opened state) between "t2" through "t5" and between "t6" through "t9." The first-inputting switching element SW11 is connected to the ground potential between "t1" through "t3" and between "t5" through "t7"; and is connected to the constant-voltage power source 11 between "t3" through "t5" and between "t7" through "t9." The second-inputting switching element SW12 is connected to the ground potential between "t1" and "t2," between "t4" through "t6" and between "t8" and "t9"; and is connected to the constant-voltage power source 11 between "t2" through "t4" and between "t6" through "t8."

Note herein that a state where the input voltage "Vin" is not applied to the one of the opposite end sides of the measurement-objective capacitance "Cn" and the second input voltage "Vin" is not applied to the one of the opposite end sides of the second capacitor 31 is labeled a "first state." Another state where the input voltage "Vin" is not applied to the one of the opposite end sides of the measurement-objective capacitance "Cn" but the second input voltage "Vin" is applied to the one of the opposite end sides of the second capacitor 31 is labeled a "second state." Still another state where the input voltage "Vin" is applied to the one of the opposite end sides of the measurement-objective capacitance "Cn" and the second input voltage "Vin" is applied to the one of the opposite end sides of the second capacitor 31 is labeled a "third state." A further state where the input voltage "Vin" is applied to the one of the opposite end sides of the measurement-objective capacitance "Cn" but the second input voltage "Vin" is not applied to the one of the opposite end sides of the second capacitor 31 is labeled a "fourth state."

And, as illustrated in FIG. 5, the states are switched in the order of the first state, the second state, the third state, and the fourth state. On this occasion, the output voltage "Vout" becomes as shown at the lowermost line in FIG. 5. And, the gauge 14 gains an equivalent value for the measurement-objective capacitance "Cn" based on a difference between a potential "Vo2" at the other one of the opposite end sides of the measurement-objective capacitance "Cn" in the second state from "t2" to "t3" and another potential "Vo3" at the other one of the opposite end sides of the measurement-objective capacitance "Cn" in the third state (i.e., "Vo2"-"Vo3"). Alternatively, the gauge 14 gains an equivalent value for the measurement-objective capacitance "Cn" based on still another potential "Vo4" at the other one of the opposite end sides of the measurement-objective capacitance "Cn" in the fourth state from "t4" to "t5."

Hereinafter, explanations will be made as to the construction of an equivalent circuit in each of the states from the first state to the fourth state, and as to the output voltage "Vout," with reference to FIG. 6 through FIG. 9.

Figure 6:
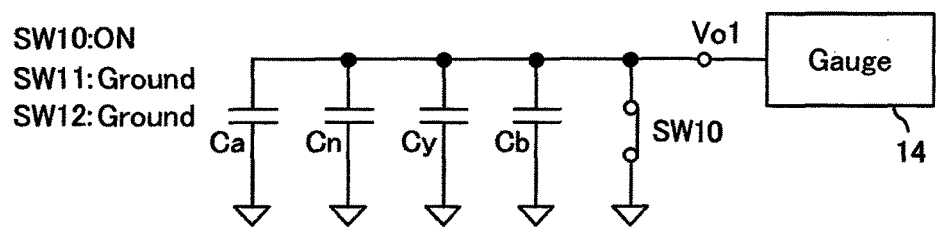
FIG. 6 illustrates a measurement circuit when SW10 is turned to the closed state (i.e., "ON") and SW11 and SW12 are connected to a ground potential.

In the first state from "t1" to "t2" in FIG. 5, the charging/discharging switching element SW10 is put in the closed state, and the first-inputting and second-inputting switching elements (SW11, SW12) are connected to the ground potential. Therefore, a circuit in this state becomes as shown in FIG. 6. As illustrated in FIG. 6, all of the capacitances ("Ca," "Cn," "Cy," "Cb") are connected to the ground potential on one of the opposite sides, and these capacitances ("Ca," "Cn," "Cy," "Cb") are connected to the gauge 14 on another one of the opposite sides. In addition, since the charging/discharging switching element SW10 is put in the closed state, potentials at the other one of the opposite end sides of the capacitances ("Ca," "Cn," "Cy," "Cb") become the ground potential (being 0 (zero) herein). Equation (3) below expresses a potential "Vo1" (or output voltage "Vout") that the gauge 14 measures on this occasion. That is, the potential "Vo1" becomes zero serving as a reference-state potential.

(Mathematical Formula 3)

$$Vo1 = \frac{0}{Ca + Cn + (Cy + Cb)} \times Vin \quad (3)$$

Figure 7:
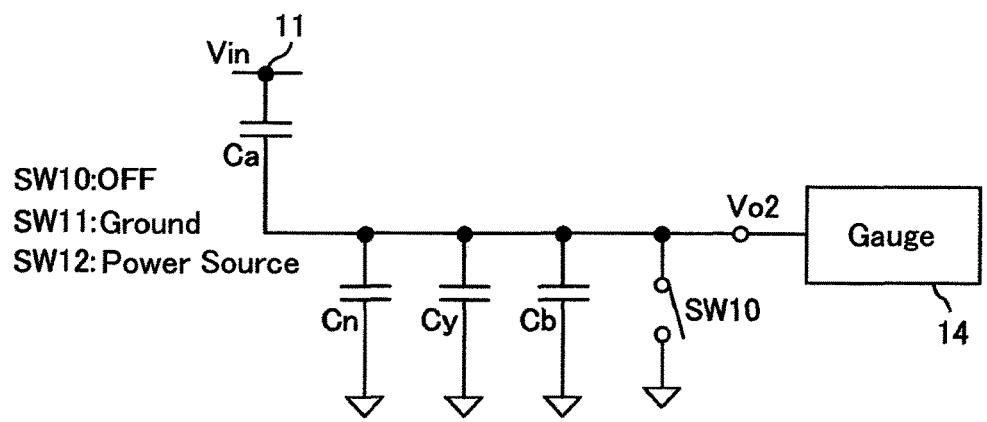
FIG. 7 illustrates a measurement circuit when SW10 is turned to the opened state (i.e., "OFF"), SW11 is connected to the ground potential and SW12 is connected to a power source.

In the second state from "t2" to "t3" in FIG. 5, the charging/discharging switching element SW10 is put in the opened state, the first-inputting switching element SW11 is connected to the ground potential, and the second-inputting switching element SW12 is connected to the constant-voltage power source 11. On this occasion, as illustrated in FIG. 7, the capacitance "Ca" is connected to the constant-voltage power source 11 on one of the opposite end sides, and the other capacitances ("Cn," "Cy," "Cb") are connected to the ground potential on one of the opposite sides. That is, a potential "Vo2," which the gauge 14 measures, becomes an intermediate potential between the capacitance "Ca" and a summed value of the capacitances ("Cn," "Cy," "Cb"). Equation (4) below expresses the potential "Vo2" that the gauge 14 measures on this occasion. That is to say, the potential "Vo2" becomes a potential that is equivalent to the capacitance "Ca" of the second capacitor 31.

(Mathematical Formula 4)

$$Vo2 = \frac{Ca}{Ca + Cn + (Cy + Cb)} \times Vin \quad (4)$$

Figure 8:
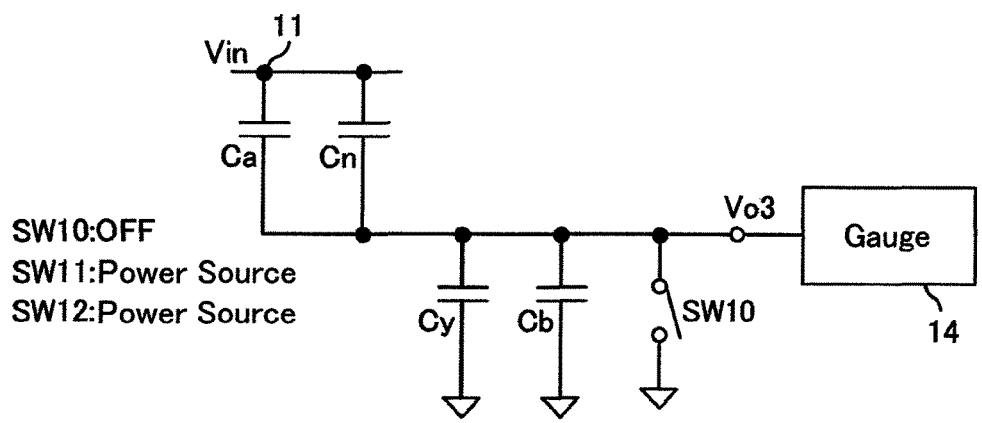
FIG. 8 illustrates a measurement circuit when SW10 is turned to the opened state (i.e., "OFF") and SW11 and SW12 are connected to the power source.

In the third state from "t3" to "t4" in FIG. 5, the charging/discharging switching element SW10 is put in the opened state, and the first-inputting and second-inputting switching elements (SW11, SW12) are connected to the constant-voltage power source 11. On this occasion, as illustrated in FIG. 8, the capacitances ("Ca," "Cn") are connected to the constant-voltage power source 11 on one of the opposite sides, the other capacitances ("Cy," "Cb") are connected to the ground potential on one of the opposite sides, and these capacitances ("Ca," "Cn," "Cy," "Cb") are connected to the gauge 14 on another one of the opposite end sides. That is, a potential "Vo3," which the gauge 14 measures, becomes an intermediate potential between a summed value of the capacitances ("Ca," "Cn") and another summed value of the capacitances ("Cy," "Cb"). Equation (5) below expresses the potential "Vo3" that the gauge 14 measures on this occasion. That is to say, the potential "Vo3" becomes a potential that is equivalent to the summed value of the capacitances ("Ca," "Cn")

(Mathematical Formula 5)

$$Vo3 = \frac{Ca + Cn}{Ca + Cn + (Cy + Cb)} \times Vin \quad (5)$$

Figure 9:
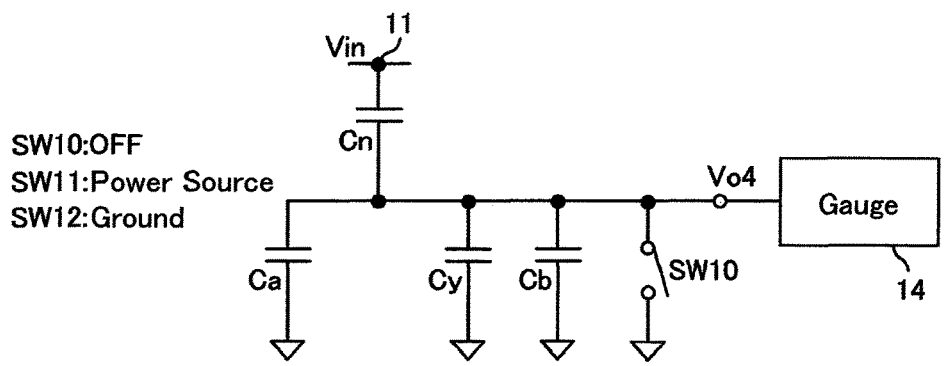
FIG. 9 illustrates a measurement circuit when SW10 is turned to the opened state (i.e., "OFF"), SW11 is connected to the power source and SW12 is connected to the ground potential.

In the fourth state from "t4" to "t5" in FIG. 5, the charging/discharging switching element SW10 is put in the opened state, the first-inputting switching element SW11 is connected to the constant-voltage power source 11, and the second-inputting switching elements SW12 is connected to the ground potential. On this occasion, as illustrated in FIG. 9, the capacitance "Cn" is connected to the constant-voltage power source 11 on one of the opposite sides, the other capacitances ("Ca," "Cy," "Cb") are connected to the ground potential on one of the opposite sides, and these capacitances ("Ca," "Cn," "Cy," "Cb") are connected to the gauge 14 on another one of the opposite end sides. That is, a potential "Vo4," which the gauge 14 measures, becomes an intermediate potential between the capacitance "Cn" and a summed value of the capacitances ("Ca," "Cy," "Cb"). Equation (6) below expresses the potential "Vo4" that the gauge 14 measures on this occasion. That is to say, the potential "Vo4" becomes a potential that is equivalent to the measurement-objective capacitance "Cn."

(Mathematical Formula 6)

$$Vo4 = \frac{Cn}{Ca + Cn + (Cy + Cb)} \times Vin \qquad (6)$$

Note herein that the gauge 14 can gain an equivalent value for the measurement-objective capacitance "Cn" based on the potential "Vo4" at the other one of the opposite end sides of the measurement-objective capacitance "Cn" in the fourth state from "t4" to "t5," as described above. In the case of the measurement using the potential "Vo4," the switching back and forth between the first state and the fourth state will suffice. However, since the potential "Vo4" is a value that is close to the ground potential, it might possibly be affected by noises.

Hence, the gauge 14 can obtain a more highly accurate capacitance equivalent value by gaining an equivalent value for the measurement-objective capacitance "Cn" based on a difference between the potential "Vo2" at the other one of the opposite end sides of the measurement-objective capacitance "Cn" in the second state from "t2" to "t3" and the potential "Vo3" at the other one of the opposite end sides of the measurement-objective capacitance "Cn" in the third state (i.e., "Vo2"-"Vo3"). That is, it is possible to utilize the difference between the second-state output voltage "Vo2" and the third-state output voltage "Vo3" by switching the timing of activating the first-inputting switching element SW11 and second-inputting switching element SW12 in the following order: the first state; the second state; the third state; and the fourth state, as shown in FIG. 5.

Capacitance Measurement Device According to Fourth Embodiment

Figure 10:
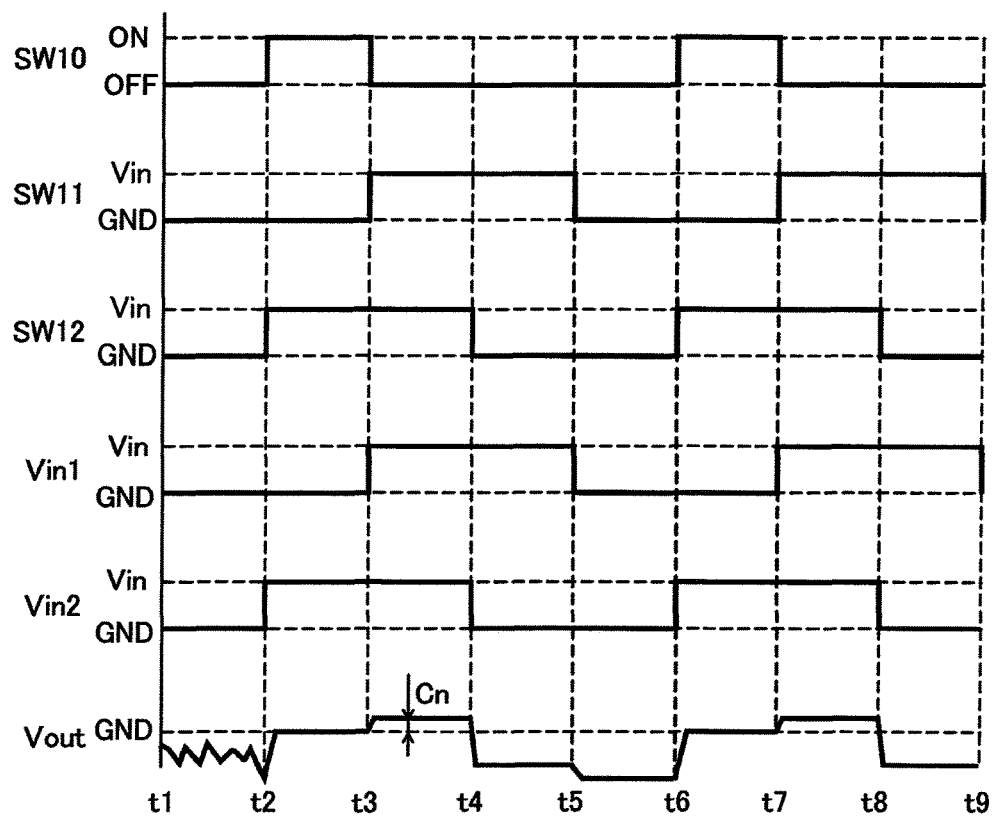
FIG. 10 is a timing chart for the activation or actions of switching devices (SW10, SW11, SW12), a potential "Vin1" at one of the opposite end sides of a measurement-objective capacitance "Cn," a potential "Vin2" at one of the opposite end sides of a second capacitor and an output voltage "Vout" in Fourth Embodiment.

Then, a capacitance measurement device according to Fourth Embodiment differs from the capacitance measurement device 30 according to Third Embodiment only in terms of the switching operations or actions for the charging/discharging switching element SW10. As illustrated in FIG. 10, the charging/discharging switching element SW10 is turned to "OFF" (i.e., the opened state) between "t1" and "t2," between "t3" through "t6" and between "t7" through "t9," and is turned to "ON" (i.e., the closed state) between "t2" and "t3," and between "t6" and "t7." Note that the following are the same as those described in Third Embodiment: the first-inputting and second inputting switching elements (SW11, SW12); the potential "Vin1" at the one of the opposite end sides of the measurement-objective capacitance "Cn"; and the potential "Vin2" at the one of the opposite end sides of the second capacitor 31.

While taking as a reference state the second-state circumstance under which the charging/discharging switching element SW10 is turned to the closed state, a calibration is carried out. That is, the output voltage "Vout" shows a value that results from making zero the output voltage "Vo2" on the occasion of the second state between "t2" and "t3," or between "t6" and "t7." Therefore, the gauge 14 can gain an equivalent value for the measurement-objective capacitance "Cn" by only measuring the third-state output voltage "Vo3."

Capacitance-Type Planar Sensor Apparatus According to First Embodiment

Next, explanations will be made as to a capacitance-type planar sensor apparatus using one of the above-described capacitance measurement devices.

Overall Structure of Capacitance-Type Sensor Apparatus

Figure 11:
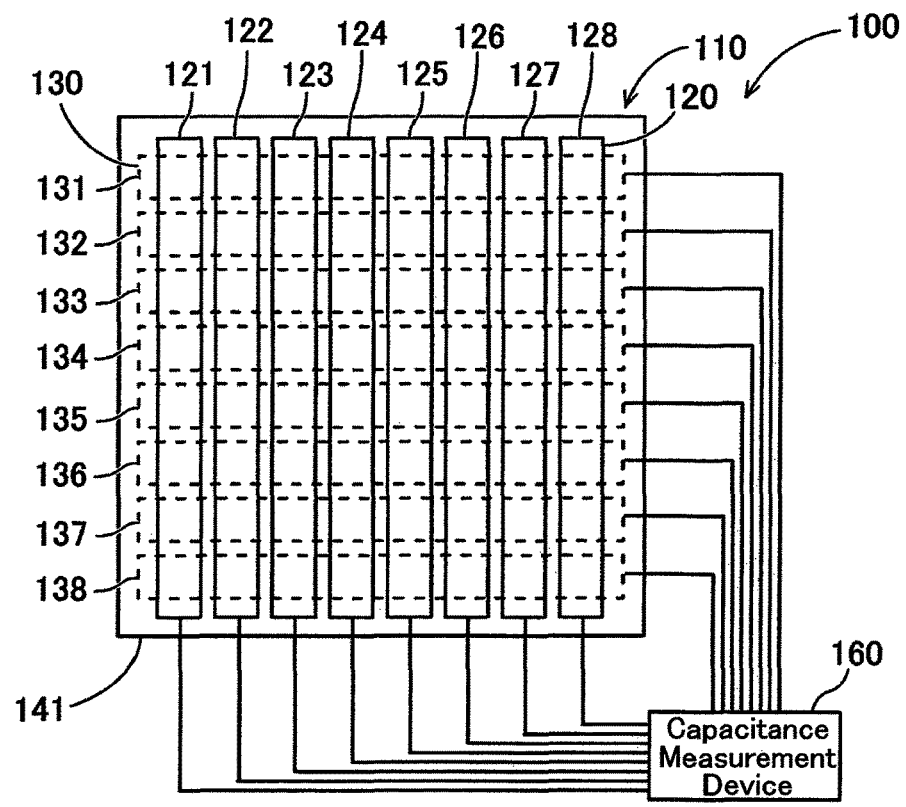
FIG. 11 illustrates a construction of a capacitance-type planar sensor apparatus 100 according to First Embodiment, wherein a sensor body 110 is shown as a plan view.
Figure 12:
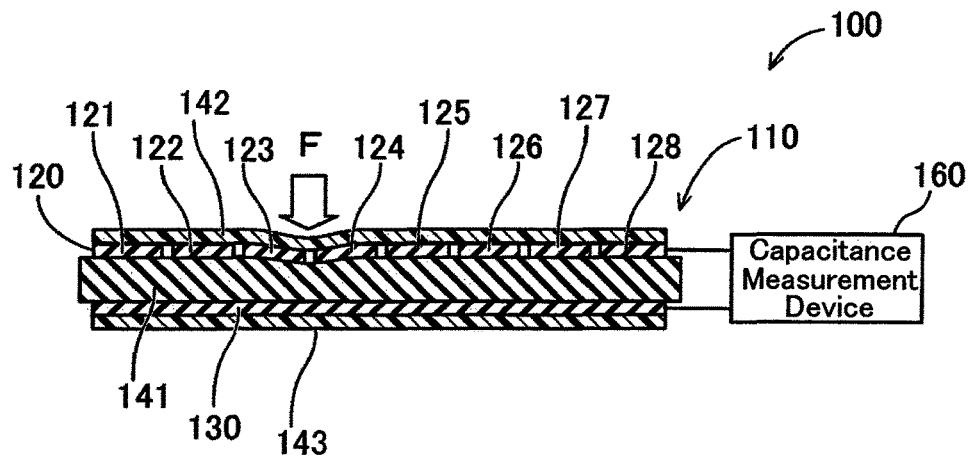
FIG. 12 illustrates another construction of the capacitance-type planar sensor apparatus 100 illustrated in FIG. 11, wherein the sensor body 110 is shown as a cross-sectional view.

As illustrated in FIG. 11 and FIG. 12, a capacitance-type planar sensor apparatus 100 comprises a sensor body 110 formed as a sheet shape (or a planar shape), thereby measuring a capacitance (i.e., a measurement-objective capacitance) between electrodes in the sensor body 110.

Note herein that the sensor body 110 is applicable as a pressure-sensitive sensor that detects the position and magnitude of given external forces, and is also applicable as a touch panel that detects positions with which a conductor, such as a human finger, contacts, or to which it approaches. And, as illustrated in FIG. 11 and FIG. 12, the capacitance-type planar sensor apparatus 100 comprises the sensor body 110, and a capacitance measurement device 160.

Detailed Construction of Sensor Body 110

In the present Embodiment, the sensor body 110 is formed in a sheet shape, exhibits flexibility, and has stretchable properties. This sensor body 110 can be turned not only into a planar configuration, but also into a curved-surface configuration. However, the sensor 110 with a planar configuration will be herein after given as an example with reference to FIG. 11 and FIG. 12. Note that, when the sensor body 110 is applicable as a touch panel as described above, the flexibility and stretchablility are not necessarily required.

The sensor body 110 includes multiply-lined first electrodes 120 (e.g., 121 through 128), multiply-columned second electrodes 130 (e.g., 131 through 138), a dielectric layer 141, and insulative layers (142, 143 (shown in FIG. 12)). The respective first-electrode constituents (121 through 128) in the multiply-lined first electrodes 120 are formed in a strip shape, and are put in place so as to elongate in the up/down direction in FIG. 11, and so as to be parallel to one another.

The respective second-electrode constituents (131 through 138) in the multiply-columned second electrodes 130 are formed in a strip shape, and are put in place so as to elongate in the right/left direction in FIG. 11, and so as to be parallel to one another. Note that, although the multiply-lined first electrodes 120 and multiply-columned second electrodes 130 are illustrated in a set of eight lines by eight columns in FIG. 11, they are not restricted to that at all.

The multiply-lined first electrodes 120, and the multiply-columned second electrodes 130 are disposed to separate one another with a distance in the face normal-line direction (i.e., in the sheet-face front/rear direction in FIG. 11, and in the up/down direction in FIG. 12), and are disposed to face to each another. And, both of them are put in place so that facing positions between the multiply-lined first electrodes 120 and multiply-columned second electrodes 130 make a matrix shape. That is, each of the first-electrode constituents (121 through 128) faces to each of the second-electrode constituents (131 through 138), and thereby the facing positions between them make a 8-line×8-column matrix shape. Each of the 8-line×8-column matrix-shaped positions is able to be a measurement-objective position for capacitance.

Moreover, the respective first-electrode constituents (121 through 128), and the respective second-electrode constituents (131 through 138) are molded by compounding a conducting filler into an elastomer or resin. Thus, the first and second electrodes (120, 130) come to exhibit flexibility, and to have stretchable properties.

To the elastomer constituting the first and second electrodes (120, 130), the following are applicable: silicone rubber, ethylene-propylene copolymerized rubber, natural rubber, styrene-butadiene copolymerized rubber, acrylonitrile-butadiene copolymerized rubber, acrylic rubber, epichlorolhydrin rubber, chlorosulfonated polyethylene, chlorinated polyethylene, urethane rubber, and the like, for instance. Moreover, the conductive filler to be compounded in the first and second electrodes (120, 130) can satisfactorily be particles exhibiting conductivity, and fine particles, such as carbon materials and metals, are applicable thereto, for instance. Moreover, to the resin constituting the first and second electrodes (120, 130), the following are applicable: polyester resin, modified polyester resin, polyether-urethane resin, polycarbonate-urethane resin, vinyl chloride-vinyl acetate copolymer, phenolic resin, acrylic resin, polyamide-imide resin, polyamide resin, nitrocellulose, modified nitrocelluloses, and so forth, for instance.

The dielectric layer 141 is disposed between each of the first electrodes (121 through 128) and each of the second electrodes (131 through 138). When the sensor body 110 is adapted as a pressure-sensitive sensor, the dielectric layer 141 is made compression deformable so as to make the thickness variant by external forces.

The dielectric layer 141 is molded of an elastomer or resin, exhibits flexibility, and has stretchable properties, in the same manner as the first and second electrodes (120, 130). To the elastomer constituting this dielectric layer 141, the following are applicable: silicone rubber, acrylonitrile-butadiene copolymerized rubber, acrylic rubber, epichlorolhydrin rubber, chlorosulfonated polyethylene, chlorinated polyethylene, urethane rubber, and the like, for instance. Moreover, to the resin constituting the dielectric layer 141, the following are applicable: polyethylene resin, polypropylene resin, polyurethane resin, polystyrene resin (involving cross-linked foamed polystyrene resin), polyvinyl chloride-polyvinylidene chloride copolymer, ethylene-acetic acid copolymer, and so forth, for instance.

The insulative layers (142, 143) are disposed so as to cover a front face on a side of the first electrodes 120 and a rear face on a side of the second electrodes 130, respectively. The insulative layers (142, 143) exhibit flexibility, and have stretchable properties, in the same manner as the first and second electrodes (120, 130). For an elastomer or resin constituting these insulative layers (142, 143), the materials, which have been set forth above as the elastomer or resin constituting the dielectric layer 141, are applicable.

As illustrated in FIG. 12, when the sensor body 110 to be constructed as aforementioned receives a compressing external force "F" in the face normal-line direction of the sensor body 110 (i.e., in the up/down direction in FIG. 12), the dielectric layer 141 is compression deformed in the face normal-line direction. As a result, a separation distance between the first electrodes 120 and the second electrodes 130, which are located at parts to which the external force "F" has been given, becomes smaller. In this instance, a capacitance between the first electrodes 120 and the second electrodes 130 at the parts changes so as to become larger. Hence, it is possible to measure positions, which have received the external force "F," by measuring a change in the capacitance as to each of the matrix-shaped positions at which each of the first electrodes (121 through 128) opposes to each of the second electrodes (131 through 138). In addition, it is possible to measure a magnitude of the external force "F" by measuring each of absolute values of the capacitances at the matrix-shaped positions.

Circuit of Sensor Body

Note herein that the sensor body 110 is constituted of the eight-lined first electrodes 120 and the eight-columned second electrodes 130, for instance, as shown in FIG. 11. However, in order to make explanations on the present capacitance measurement devices easier, explanations will be made hereinafter on three-lined first electrodes 120 (e.g., 121 through 123) and three-columned second electrodes 130 (e.g., 131 through 133).

Figure 13:
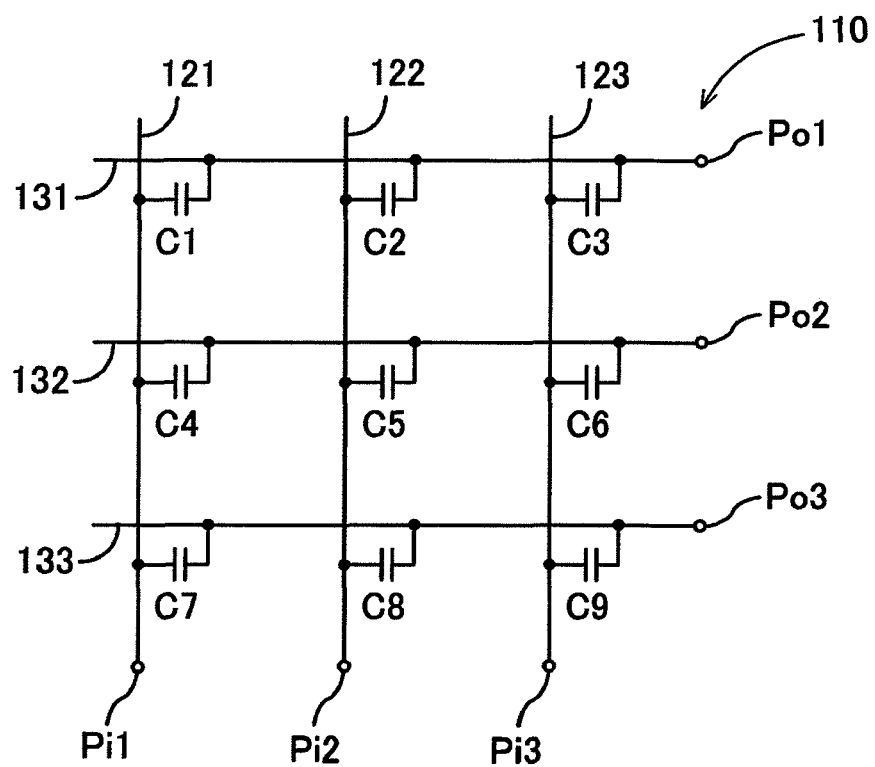
FIG. 13 is a circuit diagram when a part of the sensor body 110 shown in FIG. 11

A circuit diagram of the sensor body 110 in this instance is expressed as shown in FIG. 13. That is, capacitances ("C1" through "C9") are formed between the respective first electrodes (121 through 123) and the respective second electrodes (131 through 133). For example, a capacitance between the first electrode 121 and the second electrode 131 is "C1," and another capacitance between the first electrode 122 and the second electrode 132 is "C2." Note herein that terminals of the respective first electrodes 121 through 123 are labeled Pi1 through Pi3, and terminals of the respective second electrodes 131 through 133 are labeled Po1 through Po3.

Construction of Capacitance Measurement Device

Next, explanations will be made as to the construction of a capacitance measurement device 160 with reference to FIG. 14 and FIG. 15. Note herein that the capacitance measurement device 160 according to the present embodiment employs the circuit construction of the capacitance measurement device 30 according to Third Embodiment that has been explained with reference to FIG. 4.

In FIG. 13, connections to the terminals (Pi1 through Pi3) of the respective first electrodes (121 through 123) are switched one after another orderly in the sensor body 110. In addition, connections to the terminals (Po1 through Po3) of the respective second electrodes (131 through 133) are switched one after another orderly in the sensor body 110. However, in order to make explanations easier, explanations will be made first as to such a case as designating as a measurement-objective position an opposing position between the first-electrode constituent 121 and the second-electrode constituent 131 to measure the capacitance "C1" with reference to FIG. 14.

Figure 14:
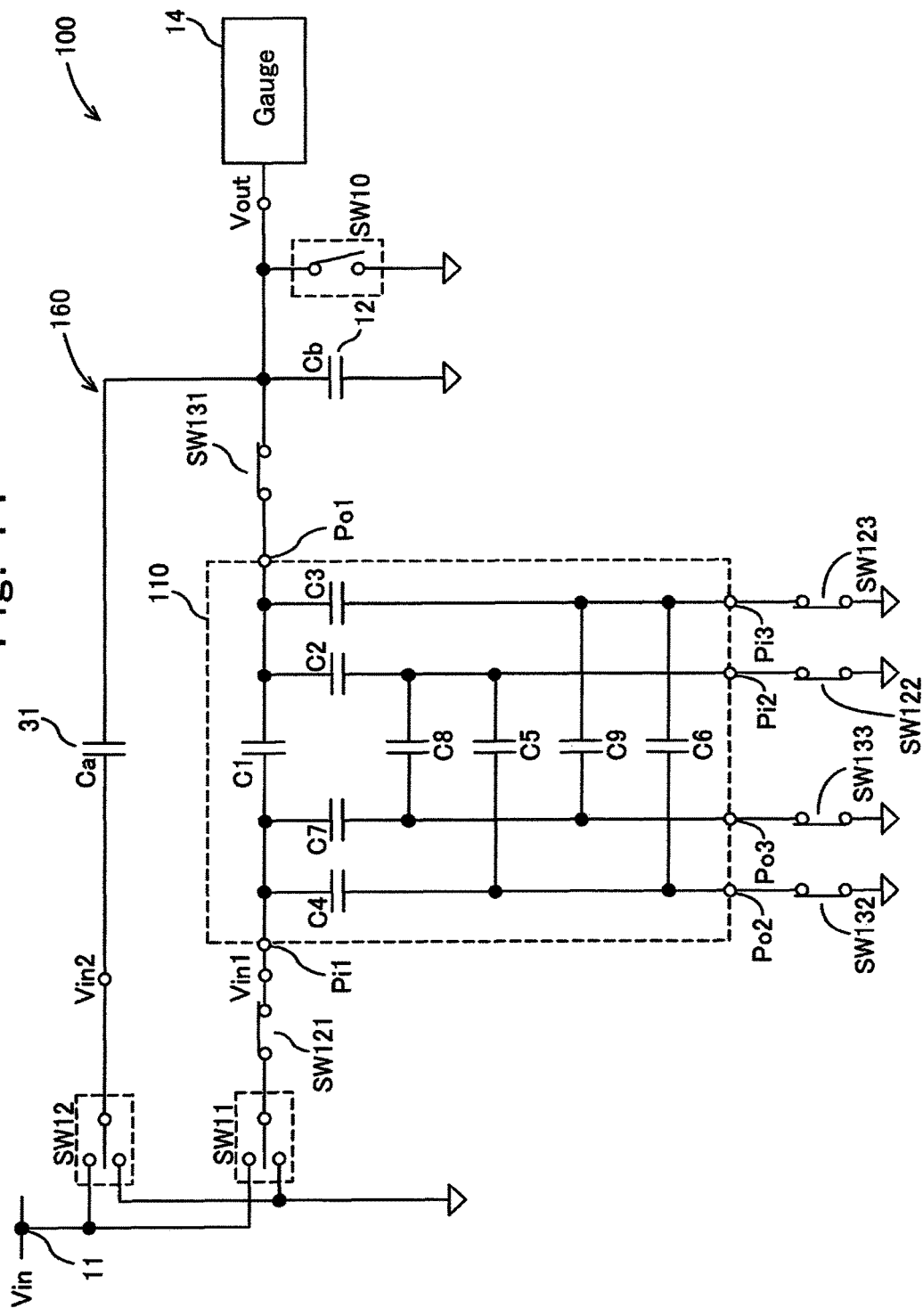
FIG. 14 illustrates a whole measurement circuit when a capacitance at a measurement-objective position is labeled "C1"

As illustrated in FIG. 14, the capacitance measurement device 160 comprises a constant-voltage power source 11, a bridging capacitor 12, a charging/discharging switching element SW10, a controller 13, a gauge 14, a first-inputting switching element SW11, a second capacitor 31, a second inputting switching element SW12, and switches (SW121 through SW123, SW131 through 132) for measurement-object alteration. Hereinafter, the same reference numerals or symbols as those used in Third Embodiment are given to constituent elements of the capacitance measurement device 160 according to the present embodiment that are identical with those of the capacitance measurement device 30 according to Third Embodiment.

The measurement-object alteration switches (SW121 through SW123) connect one of the terminals (Pi1 through Pi3) of the first electrodes (121 through 123) to the constant-voltage power source 11, and connect the other two of them to the ground potential. Thus, the measurement-object alteration switches (SW121 through SW123) can switch the terminals to be connected to the constant-voltage power source 11. The measurement-object alteration switches (SW131 through SW133) connect one of the terminals (Po1 through Po3) of the second electrodes (131 through 133) to the gauge 14, and connect the other two of them to the ground potential. Thus, the measurement-object alteration switches (SW131 through SW133) can switch the terminals to be connected to the gauge 14. Note herein that the measurement-object alteration switch SW121 is connected to the constant-voltage power source 11; the switch SW131 is connected to the gauge 14; and the other switches (SW122, SW123, SW132, SW 133) are connected to the ground potential.

The bridging capacitor 12 exhibits a capacitance "Cb" that is set up to be constant. The bridging capacitor 12 is connected to the respective second electrodes (131 through 133) on one of the opposite sides by way of the respective measurement-object alteration switches (SW121 through SW123). The bridging capacitor 12 is connected to the ground potential on another one of the opposite sides. The capacitance "Cb" of the bridging capacitor 12 is set up to be a constant value that is a larger capacitance than the capacitances at other positions among the matrix-shaped positions located between the ground potential and the second electrode 131 at the measurement-objective position. The capacitance "Cb" of the bridging capacitor 12 is set to be a constant value that is larger by 100 times or more than the capacitances at the aforementioned other measurement-objective positions. When the capacitance at the measurement-objective position is "C1," the capacitances at the other positions among the matrix-shaped positions become a summed value of "C2" and "C3." That is, the capacitance "Cb" of the bridging capacitor 12 is set to be as large as 100 times or more of the summed value of "C2" and "C3."

Note herein that, when measuring the capacitance "C1," the capacitances ("C4," "C7") between the first-electrode constituent 121 and the ground potential hardly have any effect on a potential "Vout" that the gauge 14 measures. In addition, the capacitances ("C5," "C6," "C8," "C9") between the other first-electrode constituents (122, 123) connected to the ground potential and the other second-electrode constituents (132, 133) connected to the ground potential hardly have any effect on the potential "Vout," either. Therefore, the electric circuit of the sensor body 110 in FIG. 14 can be expressed by a substitute as shown in FIG. 15. In order for generalization, the capacitance "C1" is set to be "Cn" that expresses a measurement-objective capacitance, and the sum of capacitances "C2" and "C3" is expressed as "Cy," in FIG. 15. The respective symbols are the same as the symbols in the aforementioned capacitance measurement device 30 according to Third Embodiment.

Figure 15:
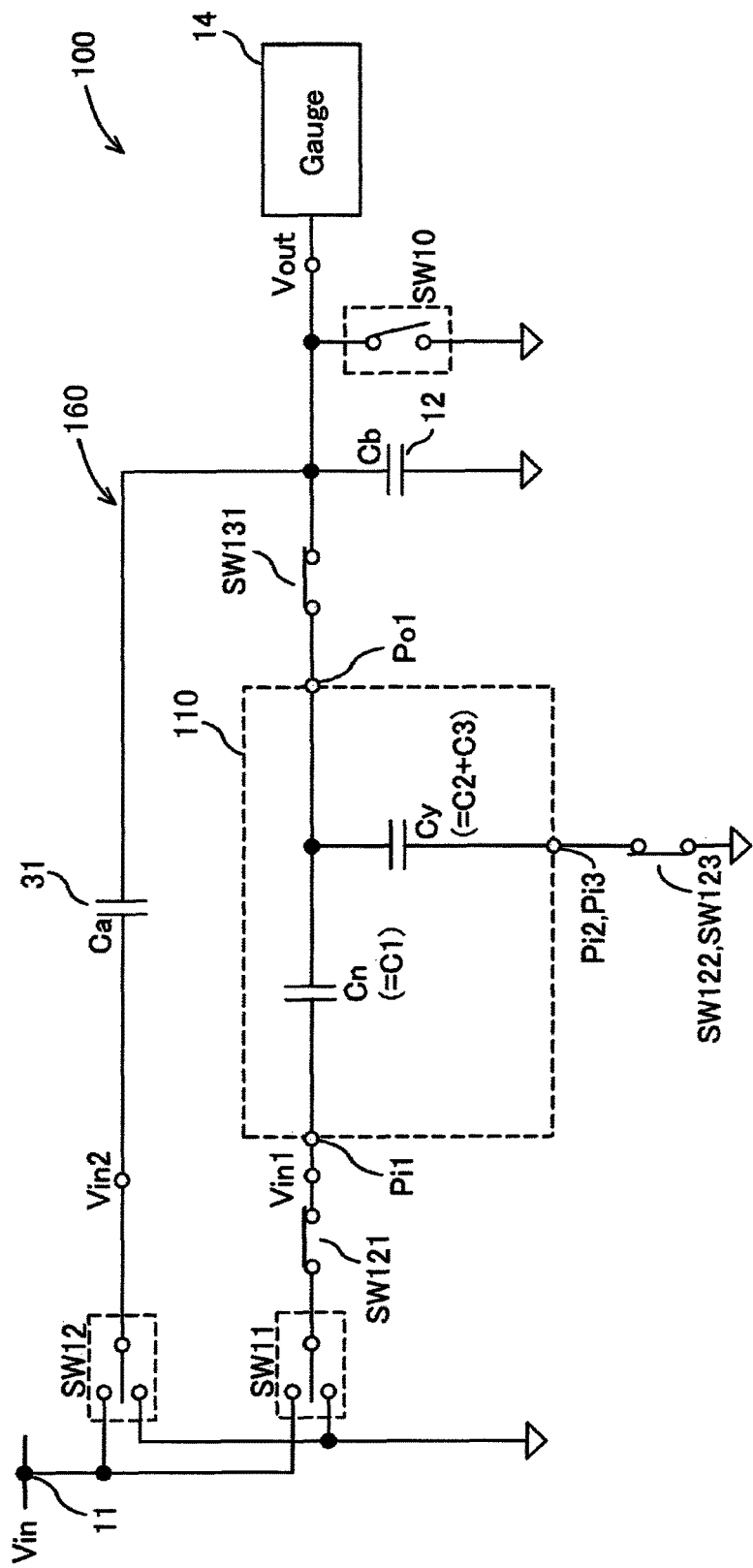
FIG. 15 illustrates a circuit that has substituted for the measurement circuit shown in FIG. 14.

Accordingly, the circuit shown in FIG. 15 is equivalent to the circuit shown in FIG. 4. Consequently, operating or activating the respective switching elements ("SW10," "SW11," "SW12") results in enabling the gauge 14 to gain the capacitance "C1" at the measurement-objective position highly accurately.

Capacitance-Type Planar Sensor Apparatus According to Second Embodiment

Figure 16:
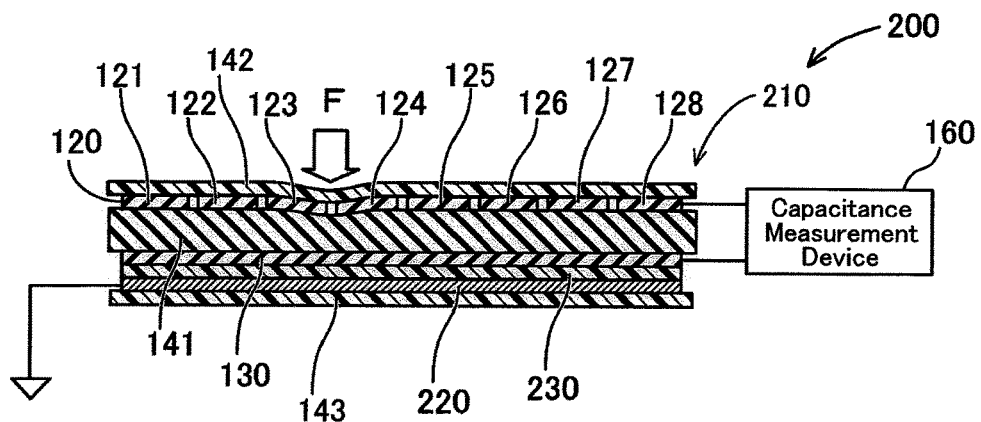
FIG. 16 illustrates a construction of a capacitance-type planar sensor apparatus 200 according to Second Embodiment, wherein a sensor body 110 is shown as a cross-sectional view.

Explanations will be made as to a capacitance-type planar sensor apparatus 200 according to Second Embodiment with reference to FIG. 16 and FIG. 17. As illustrated in FIG. 16, a sensor body 210 of the capacitance-type planar sensor apparatus 200 further includes a third electrode 220 that is added to the sensor body 110 shown in FIG. 12. The third electrode 220 is disposed so as to oppose to the second electrodes 130 on an opposite side with respect to the first electrodes 120, and is connected to the ground potential. That is, the third electrode 220 is disposed on a rear-face side of the second electrodes 130 (i.e., on the lower side in FIG. 16) by way of the insulative layer 230. The third electrode 220 has such a size as being substantially comparable with that of the insulative layer 143. And, the third electrode 220 is covered by the insulative layer 143 on the rear-face side.

Figure 17:
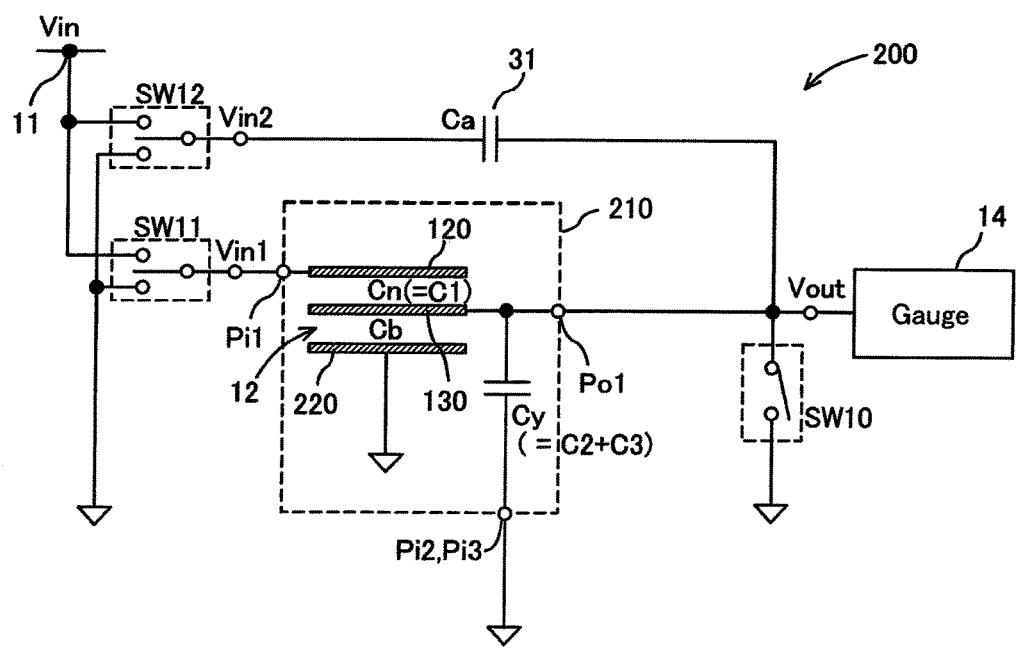
FIG. 17 illustrates a measurement circuit in FIG. 16 when a capacitance at a measurement-objective position is labeled "C1"

FIG. 17 illustrates a circuit diagram in this instance. A capacitor formed of the second electrodes 130 and the third electrode 220 functions as the bridging capacitor 12 shown in FIG. 15. That is, a capacitance between the second electrodes 130 and the third electrode 220 becomes the "Cb." Since the bridging capacitor 12 is thus constituted using the third electrode 220, it is not needed at all to dispose a capacitor being used exclusively. Therefore, the resulting structure is simplified. In addition, since the electrode members are formed to exhibit the capacitances ("Cn," "Cb") integrally, both of the capacitances follow up well to temperature changes, for instance. Therefore, even when the temperatures have changed, it is possible to measure the measurement-objective capacitance "Cn" highly accurately.

Capacitance-Type Planar Sensor Apparatus According to Third Embodiment

Figure 18:
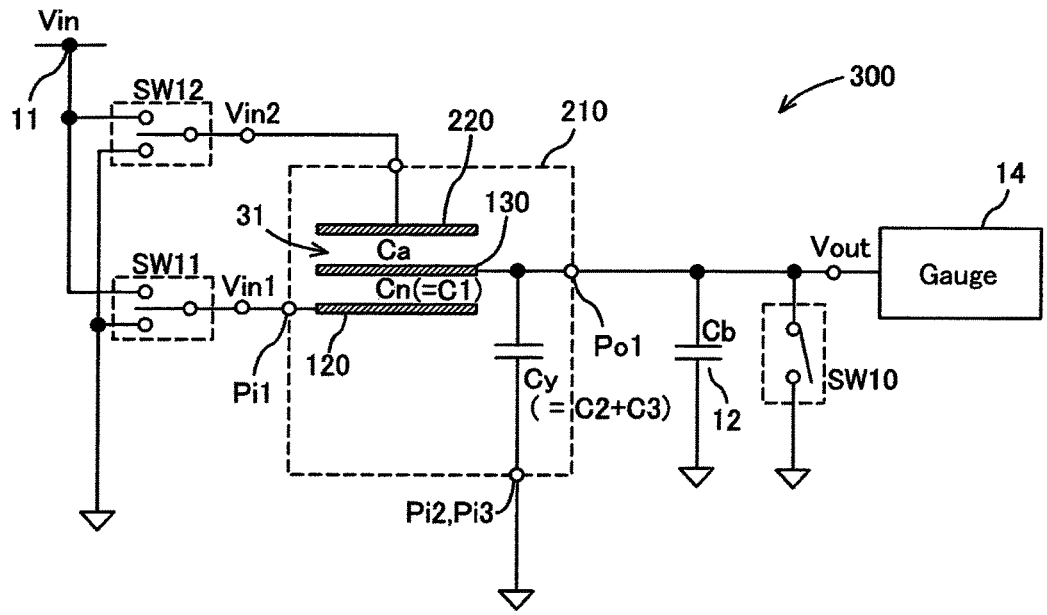
FIG. 18 illustrates a measurement circuit in a capacitance-type planar sensor apparatus 300 according to Third Embodiment when a capacitance at a measurement-objective position is labeled "C1"

Explanations will be made as to a capacitance-type planar sensor apparatus 300 according to Third Embodiment with reference to FIG. 18. As illustrated in FIG. 18, a sensor body of the capacitance-type planar sensor apparatus 300 is constituted in the same manner as the censor body 210 shown in FIG. 16. However, the third electrode 220 is not connected to the ground potential, but is connected to the second-inputting switching element SW12.

That is, a capacitor formed of the second electrodes 130 and the third electrode 220 constitutes the second capacitor 31 as shown in FIG. 18. That is to say, a capacitance between the second electrodes 130 and the third electrode 220 becomes the "Ca." Accordingly, the second capacitor being used exclusively becomes unnecessary. In addition, since the electrode members are formed to exhibit the capacitances ("Cn," "Ca") integrally, both of the capacitances follow up well to temperature changes, for instance. Consequently, even when the temperatures have changed, it is possible to measure the measurement-objective capacitance "Cn" highly accurately.

Capacitance-Type Planar Sensor Apparatus According to Fourth Embodiment

Figure 19:
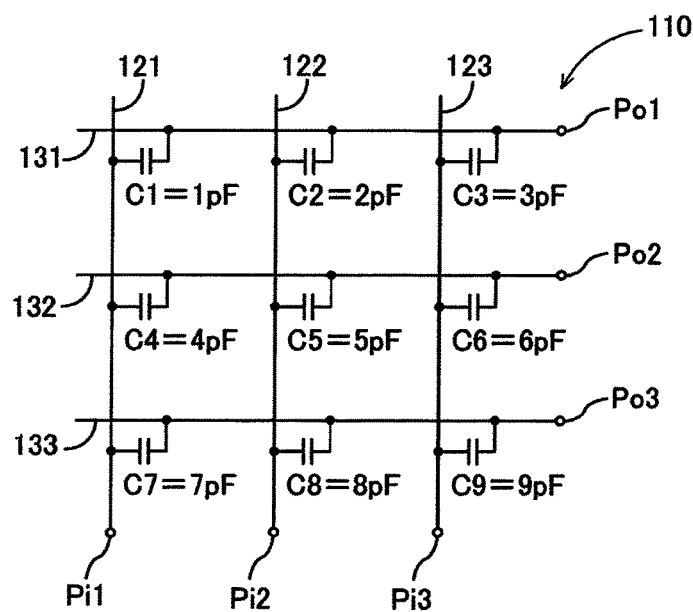
FIG. 19 illustrates capacitance values for the respective capacitances "C1" through "C9" in order for explaining a capacitance-type planar sensor apparatus according to Fourth Embodiment.

Explanations will be made as to a capacitance-type planar sensor apparatus according to Fourth Embodiment with reference to FIG. 19 and FIG. 20. In the aforementioned embodiments, the gauge 14 is set to gain an equivalent value for the measurement-objective capacitance "Cn" based on the difference between the potential "Vo2" at the other one of the opposite end sides of the measurement-objective capacitance "Cn" in the second state from "t2" to "t3" and the potential "Vo3" at the other one of the opposite end sides of the measurement-objective capacitance "Cn" in the third state (i.e., ("Vo2"-"Vo3")). Alternatively, the gauge 14 is set to gain an equivalent value for the measurement-objective capacitance "Cn" based on the potential "Vo4" at the other one of the opposite end sides of the measurement-objective capacitance "Cn" in the fourth state from "t4" to "t5."

In contrast to the above-described calculation methods, the gauge 14 gains the measurement-objective capacitance "Cn" by solving simultaneous equations in the present embodiment. Equation (7) below expresses simultaneous equations when the capacitances ("Cn1," "Cn2," "Cn3") are taken as unknown quantities. That is, the simultaneous equations according to Equation (7) are expressed by the input voltage "Vin"; the respective voltages ("Vout1," "Vout2," "Vout3") at the selected second electrode 131; and the unknown-quantity capacitances ("Cn1," "Cn2," "Cn3") at the multiple positions at which the selected second electrode 131 intersects each of the multiply-lined first electrodes (121, 122, 123) three-dimensionally.

(Mathematical Formula 7)

$$\begin{cases} (Vin - Vout1) \cdot Cn1 - Vout1 \cdot Cn2 - Vout1 \cdot Cn3 = Vout1 \cdot Cb \\ -Vout2 \cdot Cn1 + (Vin - Vout2) \cdot Cn2 - Vout2 \cdot Cn3 = Vout2 \cdot Cb \\ -Vout3 \cdot Cn1 - Vout3 \cdot Cn2 + (Vin - Vout3) \cdot Cn3 = Vout3 \cdot Cb \end{cases} \quad (7)$$

The capacitances ("Cn1," "Cn2," "Cn3") are obtainable by solving the simultaneous equations according to Equation (7). The other capacitances ("Cn4" through "Cn9") are obtainable likewise by solving the other simultaneous equations.

Here, the technique of solving simultaneous equations according to the present embodiment is compared with the technique according to the aforementioned embodiments when the capacitances ("C1" through "C9") are set to be 1 pF through 9 pF. The results are as shown in FIG. 20. In FIG. 20, the white circles specify the set-up capacities, the while squares specify consequences resulting from solving the simultaneous equations according to the present embodiment, and the black circles specify consequences resulting from the technique by non-simultaneous equations according to the aforementioned embodiments.

Figure 20:
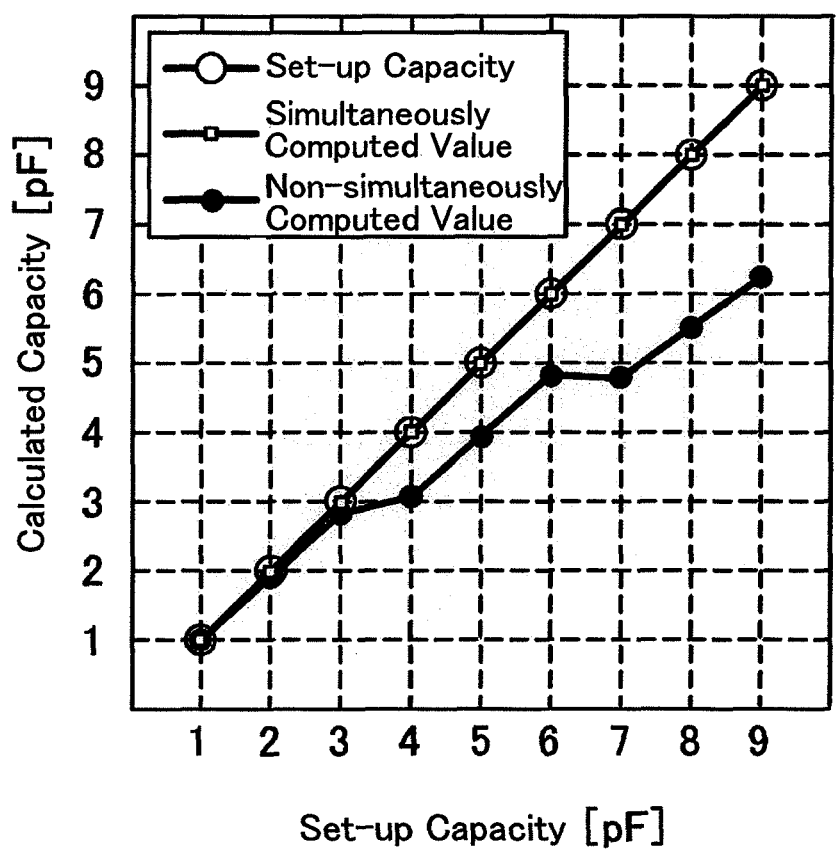
FIG. 20 is a graph for showing a difference between capacitances obtainable by means of a technique by simultaneous equations in Fourth Embodiment, and those obtainable by means of another technique by non-simultaneous equations.

As shown in FIG. 20, the technique of solving simultaneous equations makes the capacitance highly accurate compared with the technique by non-simultaneous equations. Note herein that, when measuring a potential at the other one of the opposite end sides of one of measurement-objective capacitances, the potential is believed to be affected by the other capacitances in the technique by non-simultaneous equations. Hence, since the technique of solving simultaneous equations is a computation that takes the other capacitances into account, it is possible to obtain a highly-accurate capacitance.

Alternative to Capacitance-Type Planar Sensor Apparatus

In the aforementioned sensor apparatuses according to Second and Third Embodiments, the electrode members are formed to exhibit the capacitances ("Cn," "Cb") or ("Cn," "Ca") integrally. Other than these settings, the electrode members can also be formed satisfactorily to exhibit the capacitances ("Cn," "Ca," "Cb") integrally. Thus, even when the temperatures have changed, it is possible to measure the measurement-objective capacitance "Cn" more highly accurately. Note that it is not necessary to overlap all of the electrodes one after another; namely, the electrodes effect the aforementioned advantages even if they are formed respectively on an identical substrate.

Capacitance-Type Liquid-Level Detector Apparatus According to First Embodiment

Next, explanations will be made as to the construction of a capacitance-type liquid-level detector apparatus using one of the above-described capacitance measurement devices.

Overall Structure of Capacitance-Type Liquid-Level Detector Apparatus

Figure 21:
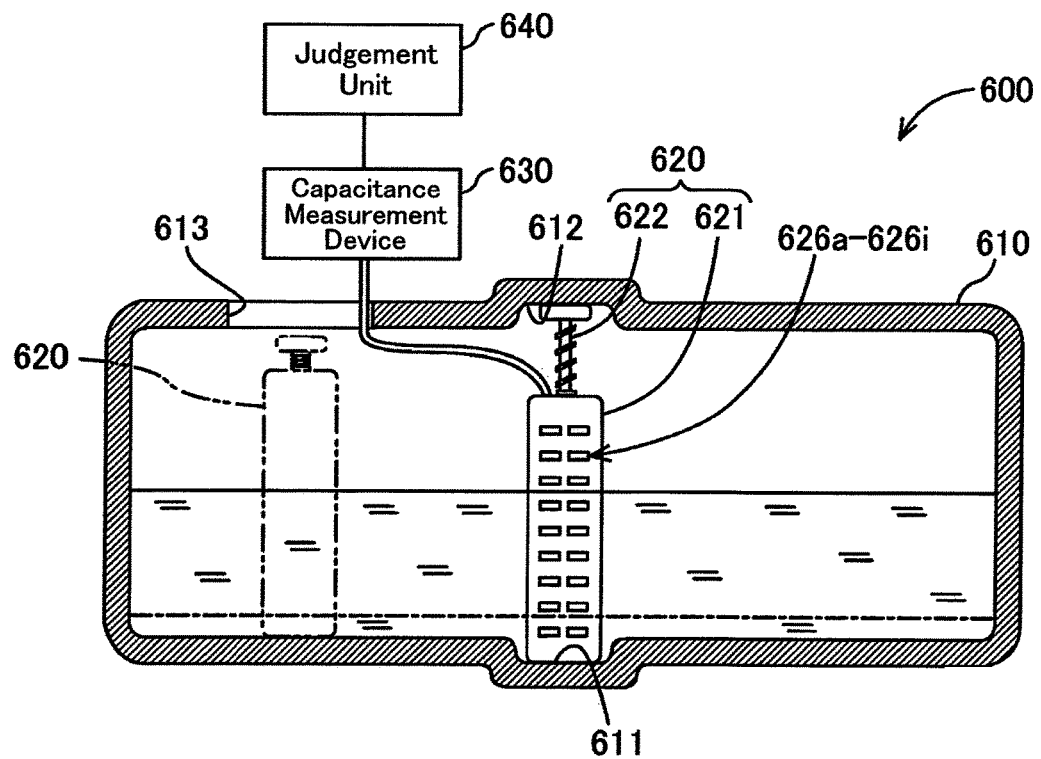
FIG. 21 illustrates a construction of a capacitance-type liquid-level detector apparatus 600 according to First Embodiment.

With reference to FIG. 21, explanations will be made as to a structure of the capacitance-type liquid-level detector apparatus (hereinafter being referred to as a "liquid-level detector apparatus"). The liquid-level detector apparatus detects a liquid level and liquid property within a fuel tank 610 of vehicle. As illustrated in FIG. 21, the fuel tank 610 is mounted on a vehicle, and stores or reserves gasoline serving as a fuel therein.

Note herein that there arises such a case as water or methanol is intermingled with a liquid to be supplied, in addition to the gasoline. The liquid-level detector apparatus judges whether the liquid in question is the gasoline, water, or methanol, and so on. In addition, the liquid-level detector judges a liquid level of the liquid, namely, a liquid level of the gasoline, a liquid level of the water, and a liquid level of the methanol. Note that, when another liquid exists or even when a floating substance exists, for instance, the liquid-level detector apparatus is also applicable to judging these instances.

The fuel tank 610 has a dent 611 in the bottom in the middle in the vehicular right/left direction, and has a dent 612 corresponding to the dent 611 in the top face. That is, the bottom dent 161, and the top-face dent 162 oppose to each other in the up/down direction. Moreover, a holed opening 613 is formed in some of the upper face of the fuel tank 610. A detachable connector is coupled with the holed opening 613.

Inside the fuel tank 610, an electrode unit 620 constituting a capacitance-type liquid-level detector apparatus 600 is disposed. The electrode unit 620 is located in the middle in the vehicular right/left direction, and is fixed between the lower bottom dent 611 and the upper top-face dent 612 in the fuel tanks 610.

The electrode unit 620 includes a sensor body 621 formed as a rod shape, and an urging member 622 disposed at an upper end of the sensor body 621 and disposed to be capable of extending from an upper-end face of the sensor body 612. The sensor body 621 has a lower end that is put in place in the dent 611 in the bottom of the fuel tank 610. The urging member 622 is urged against the dent 612 in the top face of the fuel tank 610 (i.e., against the extending direction). The thus constructed electrode unit 620 is fixed between the bottom dent 611 and top-face dent 612 in the fuel tank 610.

In addition, the sensor body 621 further includes a plurality of electrode pairs (626a through 626i) that are put in place in a displaced manner in the up/down direction (i.e., in the height direction) within the fuel tank 610. Capacitances between the respective electrode pairs in the multiple electrode pairs (626a through 626i) differ depending on the species of existing fluids.

The liquid-level detector apparatus 600 further comprises a capacitance measurement device 630 connected electrically to the multiple electrode pairs (626a through 626i) of the electrode unit 620, and a judgment unit 640.

The capacitance measurement device 630 is put in place outside the fuel tank 610, and is virtually subjected to an application of one of the above-described capacitance measurement devices. The judgment unit 640 judges the liquid level and liquid property of liquid inside the fuel tank 610 based on capacitances ("C1" through "C9") obtained by the capacitance measurement device 630.

Sensor Body of Electrode Unit

Figure 22:
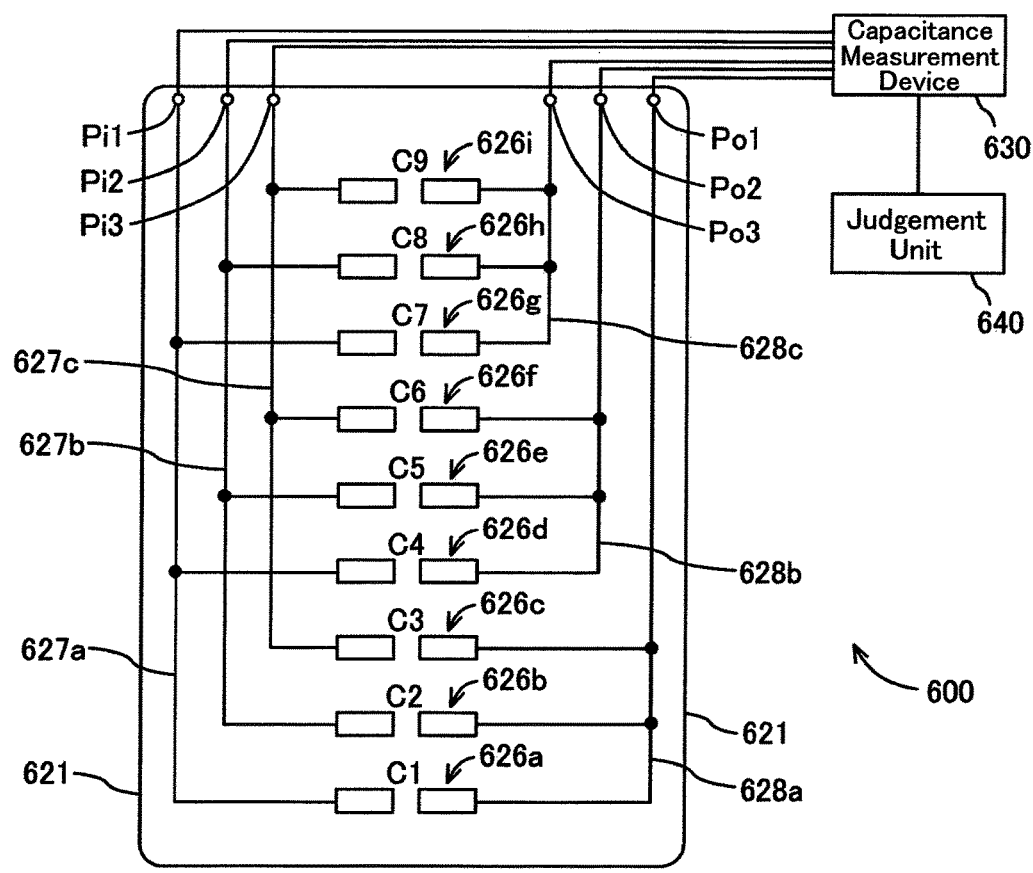
FIG. 22 illustrates a detailed construction of a sensor body 621 shown in FIG. 21.

Next, explanations will made in detail as to the sensor body 621 of the electrode unit 620 with reference to FIG. 22. The multiple electrode pairs (626a through 626i) are put in place in a displaced manner in the height direction of a substrate surface in the sensor body 621. Capacitances of the respective electrode pairs (626a through 626i) are set to be "C1" through "C9" in this order from down below.

Wiring lines (hereinafter being referred to as "application-side wiring lines") (627a through 627c), which are connected electrically to one of the electrodes of the respective electrode pairs in the multiple electrode pairs (626a through 626i), are formed. Moreover, wiring lines (hereinafter being referred to as "output-side wiring lines") (628a through 628c), which are connected electrically to another one of the electrodes of the respective electrode pairs therein, are formed.

The first application-side wiring line 627a is connected to the electrode pairs (626a, 626d, 626g); the second application-side wiring line 627b is connected to the electrode pairs (626b, 626e, 626h); and the third application-side wiring line 627c is connected to the electrode pairs (626c, 626f, 626i). The first output-side wiring line 628a is connected to the electrode pairs (626a, 626b, 626c); the second output-side wiring line 628b is connected to the electrode pairs (626d, 626e, 626f); and the third output-side wiring line 628c is connected to the electrode pairs (626g, 626h, 626i).

Note herein that terminals connected to the application-side wiring lines (627a, 627b, 627c) are labeled Pi1, Pi2, and Pi3, respectively. Other terminals connected to the output-side wiring lines (628a, 628b, 628c) are labeled Po1, Po2, and Po3, respectively.

Figure 23:
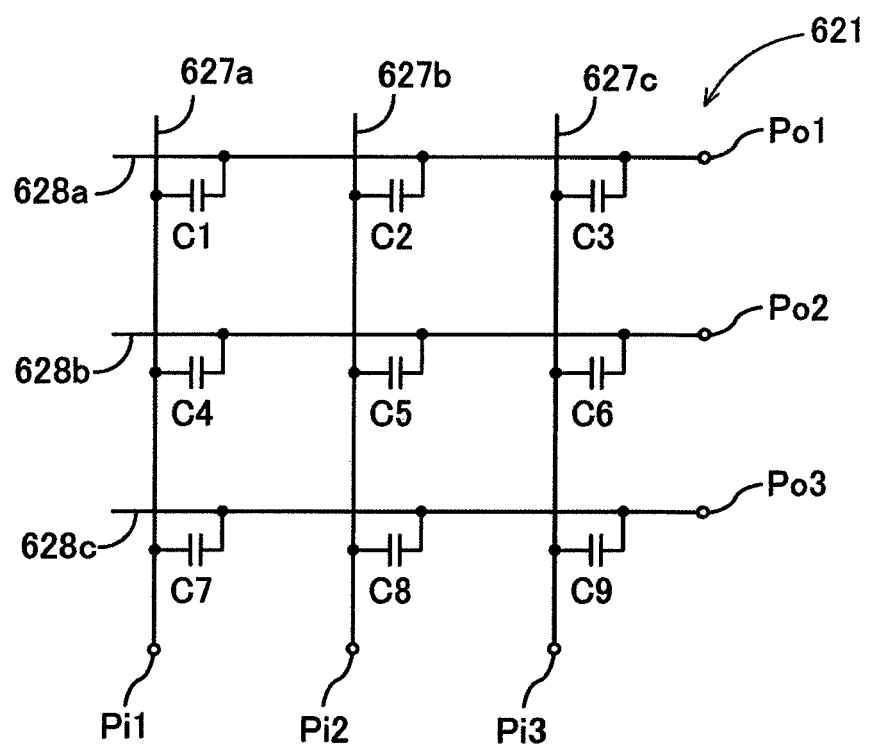
FIG. 23 illustrates an equivalent circuit to the sensor body 621 according to First Embodiment.
Figure 24:
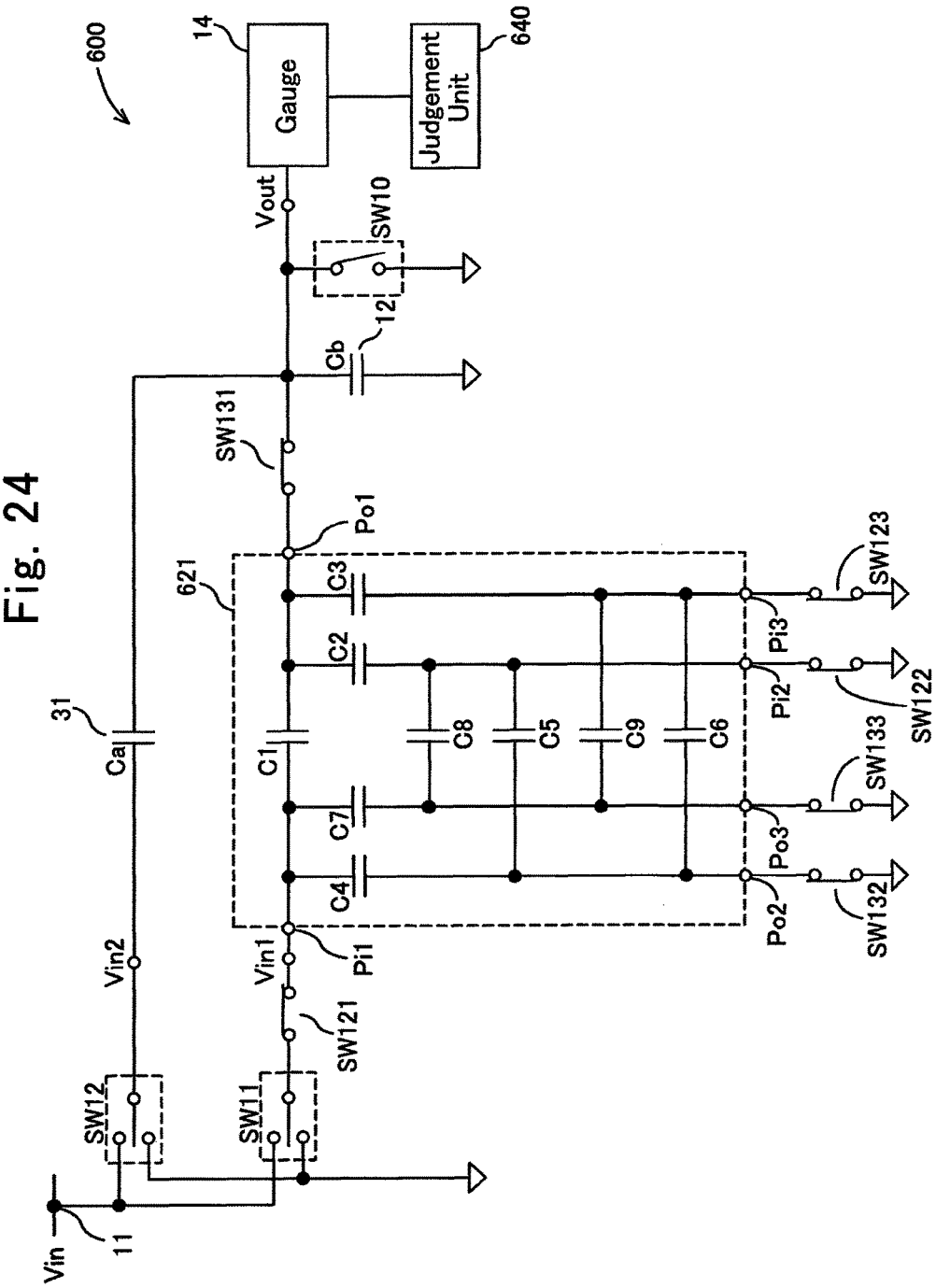
FIG. 24 illustrates a circuit construction of the capacitance-type liquid-level detector apparatus 600 according to First Embodiment.

An equivalent circuit of the above-described sensor body 621 is expressed as shown in FIG. 23. Therefore, a circuit of the liquid-level detector apparatus 600 is expressed as shown in FIG. 24. That is, the liquid-level detector apparatus 600 is equivalent to a matrix-shaped circuit in the same manner as the capacitance-type planar sensor apparatus 100. If so, to the liquid-level detector apparatus 600, it is possible to apply the above-described capacitance-type planar sensor apparatus 100 likewise.

And, the judgment unit 640 judges liquid levels at respective heights based on the capacitances ("C1" through "C9") that the gauge 14 have gained at the respective heights. Simultaneously, the judgment unit 640 can judge liquid properties of liquids at the respective heights based on the capacitances ("C1" through "C9") at the respective heights.

Capacitance-Type Liquid-Level Detector Apparatus According to Second Embodiment

Figure 25:
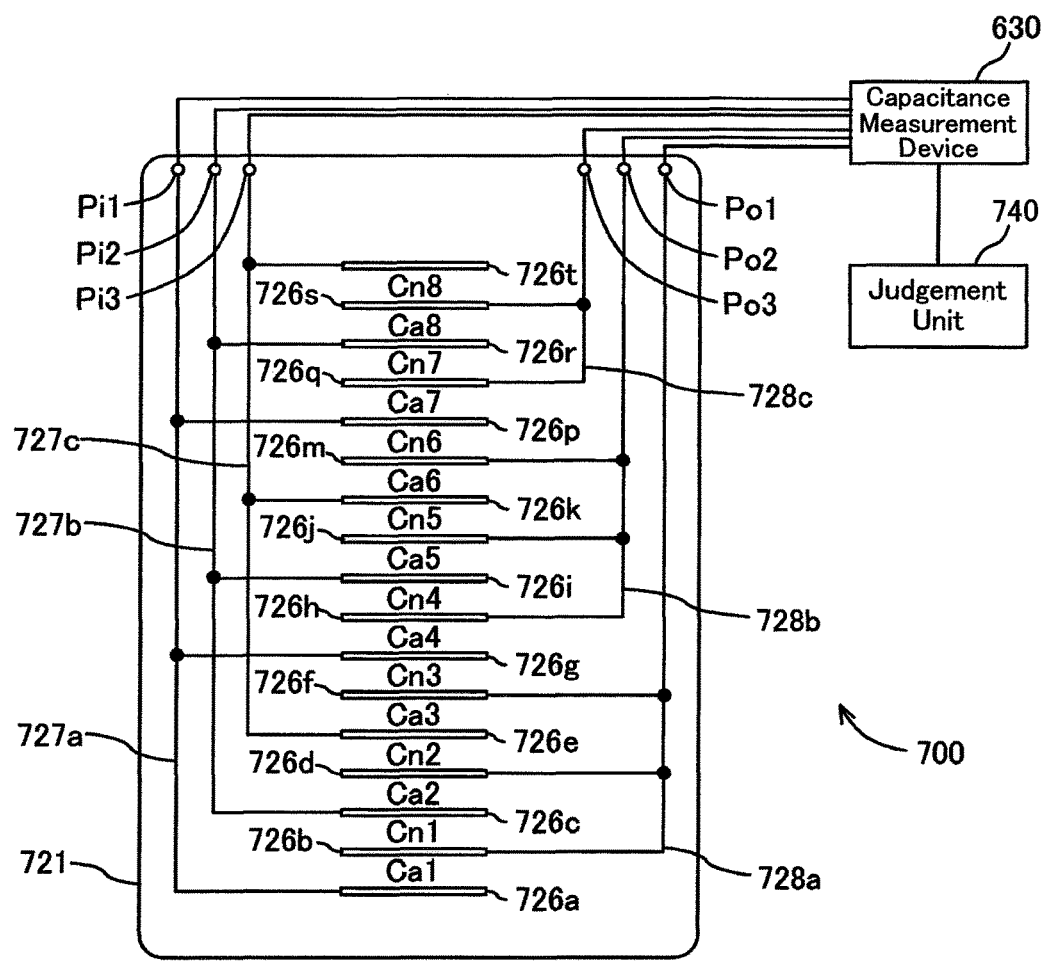
FIG. 25 illustrates a detailed construction of a sensor body 721 of a capacitance-type liquid-level detector apparatus 700 according to Second Embodiment.

In the liquid-level detector apparatus 600 according to First Embodiment, the electrodes constituting the respective electrode pairs are set so as to be located at an identical height, respectively. In a liquid-level detector apparatus 700 according to the present embodiment, however, the respective electrodes (726a through 726i) are put in place to displace in the height direction, as shown in FIG. 25. And, the electrodes connected to the application-side wiring lines (727a through 727c), and the electrodes connected to the output-side wiring lines (728a through 728c) are put in place alternately in the height direction.

Figure 26:
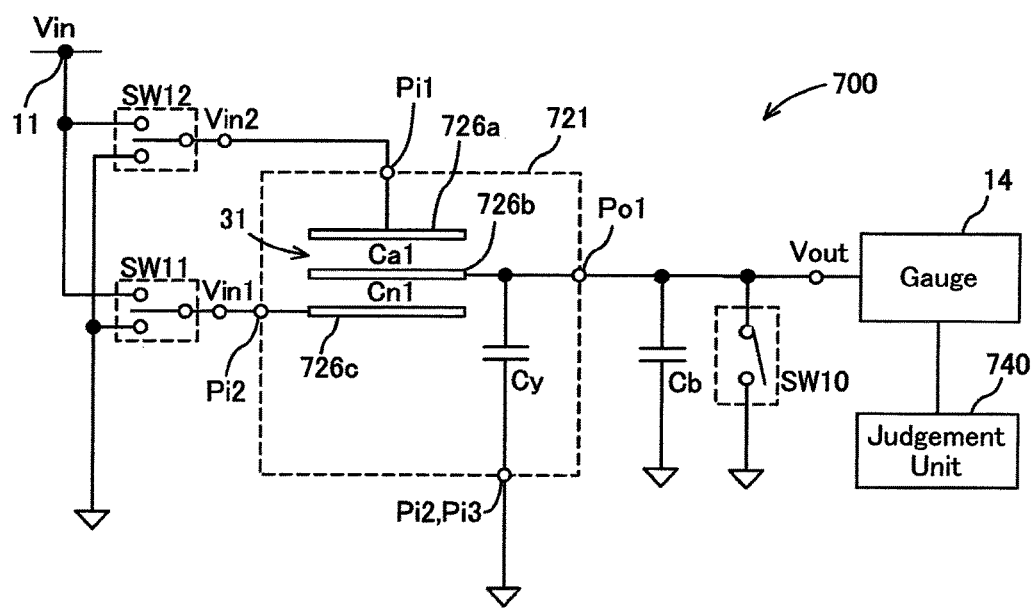
FIG. 26 illustrates a circuit construction of the capacitance-type liquid-level detector apparatus 700 according to Second Embodiment.

An equivalent circuit in this instance becomes as shown in FIG. 26. In FIG. 26, a measurement-objective capacitance is labeled "Cn1," and a capacitance of the second capacitor 31 (equivalent to the reference numeral, "31," in FIG. 24) is labeled "Ca1." Thus, the above-described second capacitor 31 is constituted of a capacitor, which is formed of the electrode 726b (i.e., one of the electrodes of the measurement-objective two electrodes (726b, 726c) that is located on a lower side) and the electrode 726a (that is located on a much lower side).

A judgment unit 740 judges boundaries between different species of liquids based on equivalent values for the measurement-objective capacitances ("Cn1" through "Cn8"). For example, when a liquid of the same species exists at a position between the electrodes 726b and 726c, which neighbor one another in the height direction, and at another position between the electrodes 726a and 726b, which neighbor one another in the height direction, "Cn1" becomes identical with "Ca1." If so, a difference between a potential equivalent to "Cn1" and another potential equivalent to "Ca1" becomes zero.

On the other hand, liquids of different species exist at a position between the electrodes 726b and 726c, which neighbor one another in the height direction, and at another position between the electrodes 726 a and 726b, which neighbor one another in the height direction, "Cn1," and "Ca1" become different values to each other. If so, a difference between a potential equivalent to "Cn1" and another potential equivalent to "Ca1" does not become zero. The judgment unit 740 judges a boundary between the liquids based on this difference.

Capacitance-Type Liquid-Level Detector Apparatus According to Third Embodiment

Figure 27:
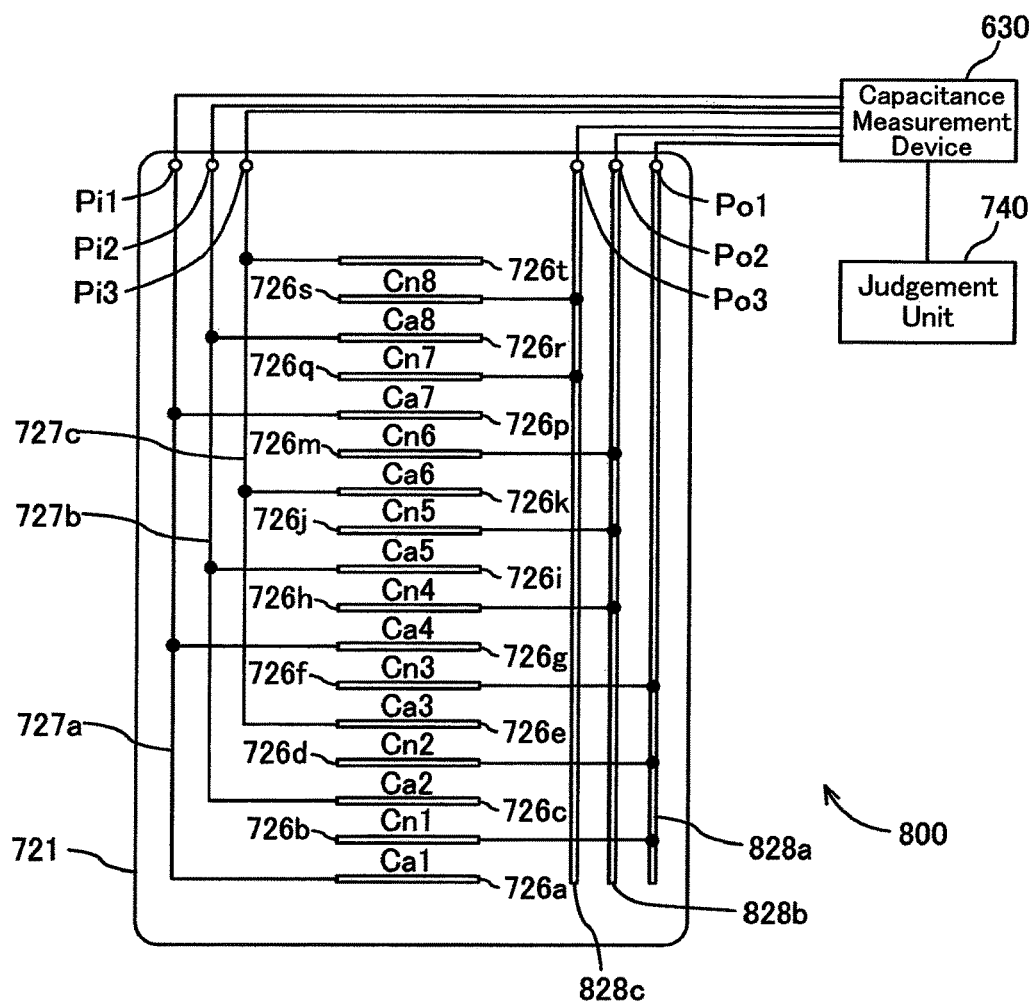
FIG. 27 illustrates a detailed construction of a sensor body 721 of a capacitance-type liquid-level detector apparatus 800 according to Third Embodiment.
Figure 28:
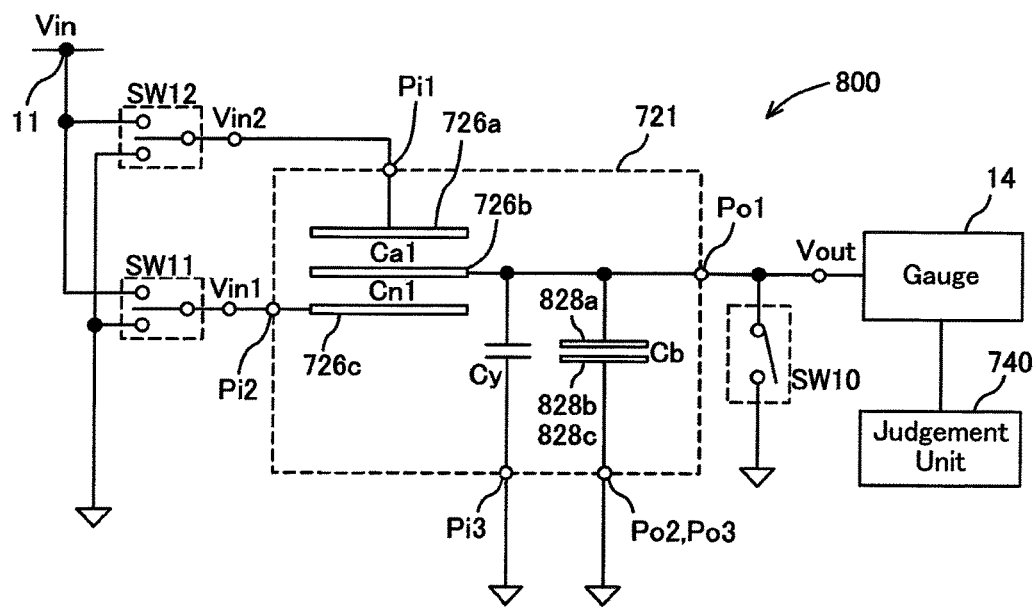
FIG. 28 illustrates a circuit construction of the capacitance-type liquid-level detector apparatus 800 according to Third Embodiment.

Next, explanations will be made as to a liquid-level detector apparatus 800 according to Third Embodiment with reference to FIG. 27 and FIG. 28. The liquid-level detector apparatus 800 according to the present embodiment is distinguished from the liquid-level detector apparatus 700 according to Second Embodiment in that output-side wiring lines (828a through 828c) are utilized as the bridging capacitor 12.

That is, the output-side wiring lines (828a, 828b, 828c) are formed long sufficiently in the height direction of the electrode unit 620. Doing thus leads to constituting the electrodes of the bridging capacitor 12 of the output-side wiring lines (828a, 828b, 828c), as shown in FIG. 28. Therefore, it is not necessary for the liquid-level detector apparatus 800 according to the present embodiment to be provided with the single-purpose or dedicated bridging capacitor 12.

What is claimed is:

1. A capacitance measurement device comprising:
    an input-voltage application device applying a constant-voltage input voltage to a first one of opposite end sides of a measurement-objective capacitance;
    a bridging capacitor connected in series to a second one of the opposite end sides of the measurement-objective capacitance, and connected between the second one of the opposite end sides of the measurement-objective capacitance and a ground potential;
a charging/discharging switching element connected in series to the second one of the opposite end sides of the measurement-objective capacitance, and connected in parallel to the bridging capacitor, thereby discharging a charge on the second one of the opposite end sides of the measurement-objective capacitance to the ground potential at the time of a closed state thereof;
a controller configured to:
  turn the input-voltage application device to a state of not applying the input voltage, and turn the charging/discharging switching element to the closed state thereof, thereby discharging the charge on the measurement-objective capacitance to the ground potential; and
  turn the charging/discharging switching element to an opened state thereof, and turn the input-voltage application device to a state of applying the input voltage, after the discharging, thereby charging the measurement-objective capacitance; and
a gauge gaining an equivalent value for the measurement-objective capacitance based on a potential between the measurement-objective capacitance and the bridging capacitor in the charging executed by the controller,
wherein the capacitance measurement device further comprises a second capacitor having an opposite end side to which a constant-voltage second input voltage is applied, and another opposite end side connected to the second one of the opposite end sides of the measurement-objective capacitance, and
wherein switching states of the capacitance measurement device occur in the following order:
  a first state of not inputting both of the input voltage and the second input voltage;
  a second state of inputting one of the input voltage and the second input voltage but not inputting another one of them;
  a third state of inputting both of the input voltage and the second input voltage; and
  a fourth state of not inputting one of the input voltage and the second input voltage but inputting the other one of them;
wherein the gauge gains an equivalent value for the measurement-objective capacitance based on a potential at the second one of the opposite end sides of the measurement-objective capacitance in the second state, the third state or the fourth state.

2. The capacitance measurement device according to claim 1, wherein the input-voltage application device includes:
  a constant-voltage power source configured to apply the input voltage; and
  a first-inputting switching element connected at one of opposite end sides thereof to the first one of the opposite end sides of the measurement-objective capacitance, connected at another one of the opposite end sides thereof to one of the constant-voltage power source and the ground potential, and configured to switch back and forth between a state where the constant-voltage power source applies the input voltage to the measurement-objective capacitance and another state where the constant-voltage power source does not apply the input voltage to the measurement-objective capacitance.

3. The capacitance measurement device according to claim 1, further comprising a third capacitor connected between the second one of the opposite end sides of the measurement-objective capacitance and the ground potential, wherein a capacitance of the bridging capacitor is set to be a larger capacitance than a capacitance of the third capacitor.

4. A capacitance measurement device comprising:
an input-voltage application device applying a constant-voltage input voltage to a first one of opposite end sides of a measurement-objective capacitance;
a bridging capacitor connected in series to a second one of the opposite end sides of the measurement-objective capacitance, and connected between the second one of the opposite end sides of the measurement-objective capacitance and a ground potential;
a charging/discharging switching element connected in series to the second one of the opposite end sides of the measurement-objective capacitance, and connected in parallel to the bridging capacitor, thereby discharging a charge on the second one of the opposite end sides of the measurement-objective capacitance to the ground potential at the time of a closed state thereof;
a controller configured to:
  turn the input-voltage application device to a state of not applying the input voltage, and turn the charging/discharging switching element to the closed state thereof, thereby discharging the charge on the measurement-objective capacitance to the ground potential; and
  turn the charging/discharging switching element to an opened state thereof, and turn the input-voltage application device to a state of applying the input voltage, after the discharging, thereby charging the measurement-objective capacitance; and
a gauge gaining an equivalent value for the measurement-objective capacitance based on a potential between the measurement-objective capacitance and the bridging capacitor in the charging executed by the controller,
wherein the capacitance measurement device gains each of equivalent values for multiple measurement-objective capacitances in a sensor body thereof; and
an equivalent circuit of the sensor body includes multiple lines of first electrodes, multiple columns of second electrodes to be put in place so as to make a matrix shape to the multiply-lined first electrodes, and multiple dielectric layers disposed at multiple positions at which the multiply-lined first electrodes and the multiply-columned second electrodes intersect one another three-dimensionally;
wherein the equivalent values for the multiple measurement-objective capacitances in the sensor body are equivalent values for capacitances between the first electrodes and the second electrodes that correspond to the respective positions in the multiple dielectric layers, and
wherein the gauge solves simultaneous equations expressed by the following:
respective voltages at the second electrodes, which are selected when the input voltage is applied to one of the first electrodes of the multiply-lined first electrodes and the other remaining first electrodes are connected to the ground potential; and
capacitances taken as unknown quantities, and exhibited at multiple positions at which the selected second electrodes intersect each of the multiply-lined first electrodes three-dimensionally;

whereby the gauge gains equivalent values for the respective capacitances taken as the unknown quantities in the simultaneous equations.

5. A capacitance-type planar sensor apparatus comprising:
multiply-lined first electrodes formed as a strip shape, and put in place to be parallel mutually;
multiply-columned second electrodes formed as a strip shape, and put in place to be parallel mutually,
the multiply-columned second electrodes whose opposing positions to the multiply-lined first electrodes are disposed to oppose to the first electrodes so as to make a matrix shape;
a dielectric layer disposed between each of the first electrodes in the multiply-lined first electrodes and each of the second electrodes in the multiply-columned second electrodes; and
a capacitance measurement device comprising:
  an input-voltage application device applying a constant-voltage input voltage to a first one of opposite end sides of a measurement-objective capacitance;
  a bridging capacitor connected in series to a second one of the opposite end sides of the measurement-objective capacitance, and connected between the second one of the opposite end sides of the measurement-objective capacitance and a ground potential;
  a charging/discharging switching element connected in series to the second one of the opposite end sides of the measurement-objective capacitance, and connected in parallel to the bridging capacitor, thereby discharging a charge on the second one of the opposite end sides of the measurement-objective capacitance to the ground potential at the time of a closed state thereof;
  a controller configured to:
    turn the input-voltage application device to a state of not applying the input voltage, and turn the charging/discharging switching element to the closed state thereof, thereby discharging the charge on the measurement-objective capacitance to the ground potential; and
    turn the charging/discharging switching element to an opened state thereof, and turn the input-voltage application device to a state of applying the input voltage, after the discharging, thereby charging the measurement-objective capacitance; and
  a gauge gaining an equivalent value for the measurement-objective capacitance based on a potential between the measurement-objective capacitance and the bridging capacitor in the charging executed by the controller,
the capacitance measurement device gaining an equivalent value for a capacitance at each of matrix-shaped positions corresponding to an opposing position of each of the first electrodes to each of the second electrodes;
wherein the first electrodes make the first one of the opposite end sides of the measurement-objective capacitance; and
the second electrodes make the second one of the opposite end sides of the measurement-objective capacitance, and
wherein the capacitance-type planar sensor apparatus further comprises a third electrode disposed so as to oppose to the second electrodes on an opposite side with respect to the first electrodes, and connected to the ground potential; and a capacitor formed of the second electrodes and the third electrode makes the bridging capacitor.

6. A capacitance-type planar sensor apparatus comprising:
multiply-lined first electrodes formed as a strip shape, and put in place to be parallel mutually;
multiply-columned second electrodes formed as a strip shape, and put in place to be parallel mutually,
the multiply-columned second electrodes whose opposing positions to the multiply-lined first electrodes are disposed to oppose to the first electrodes so as to make a matrix shape;
a dielectric layer disposed between each of the first electrodes in the multiply-lined first electrodes and each of the second electrodes in the multiply-columned second electrodes; and
a capacitance measurement device comprising:
  an input-voltage application device applying a constant-voltage input voltage to a first one of opposite end sides of a measurement-objective capacitance;
  a bridging capacitor connected in series to a second one of the opposite end sides of the measurement-objective capacitance, and connected between the second one of the opposite end sides of the measurement-objective capacitance and a ground potential;
  a charging/discharging switching element connected in series to the second one of the opposite end sides of the measurement-objective capacitance, and connected in parallel to the bridging capacitor, thereby discharging a charge on the second one of the opposite end sides of the measurement-objective capacitance to the ground potential at the time of a closed state thereof;
  a controller configured to:
    turn the input-voltage application device to a state of not applying the input voltage, and turn the charging/discharging switching element to the closed state thereof, thereby discharging the charge on the measurement-objective capacitance to the ground potential; and
    turn the charging/discharging switching element to an opened state thereof, and turn the input-voltage application device to a state of applying the input voltage, after the discharging, thereby charging the measurement-objective capacitance; and
  a gauge gaining an equivalent value for the measurement-objective capacitance based on a potential between the measurement-objective capacitance and the bridging capacitor in the charging executed by the controller,
the capacitance measurement device gaining an equivalent value for a capacitance at each of matrix-shaped positions corresponding to an opposing position of each of the first electrodes to each of the second electrodes;
wherein the first electrodes make the first one of the opposite end sides of the measurement-objective capacitance; and
the second electrodes make the second one of the opposite end sides of the measurement-objective capacitance,
wherein the capacitance-type planar sensor apparatus further comprises a third electrode disposed so as to oppose to the second electrodes on an opposite side with respect to the first electrodes;
the capacitance measurement device further comprises a second capacitor having an opposite end side to which a constant-voltage second input voltage is applied, and another opposite end side connected to the second one of the opposite end sides of the measurement-objective capacitance; and a capacitor formed of the second electrodes and the third electrode constitutes the second capacitor.

7. A capacitance-type liquid-level detector apparatus comprising:

multiple electrodes put in place in a displaced manner in a height direction thereof within a tank storing liquid;

a capacitance measurement device comprising:

an input-voltage application device applying a constant-voltage input voltage to a first one of opposite end sides of a measurement-objective capacitance;

a bridging capacitor connected in series to a second one of the opposite end sides of the measurement-objective capacitance, and connected between the second one of the opposite end sides of the measurement-objective capacitance and a ground potential;

a charging/discharging switching element connected in series to the second one of the opposite end sides of the measurement-objective capacitance, and connected in parallel to the bridging capacitor, thereby discharging a charge on the second one of the opposite end sides of the measurement-objective capacitance to the ground potential at the time of a closed state thereof;

a controller configured to:

turn the input-voltage application device to a state of not applying the input voltage, and turn the charging/discharging switching element to the closed state thereof, thereby discharging the charge on the measurement-objective capacitance to the ground potential; and turn the charging/discharging switching element to an opened state thereof, and turn the input-voltage application device to a state of applying the input voltage, after the discharging, thereby charging the measurement-objective capacitance; and a gauge gaining an equivalent value for the measurement-objective capacitance based on a potential between the measurement-objective capacitance and the bridging capacitor in the charging executed by the controller, the capacitance measurement device gaining an equivalent value for a capacity between two electrodes selected from among the multiple electrodes as the equivalent value for the measurement-objective capacitance; and a judgment unit judging a liquid level within the tank based on the equivalent value for the measurement-objective capacitance, wherein the capacitance measurement device further comprises a second capacitor having an opposite end side to which a constant-voltage second input voltage is applied, and another opposite end side connected to the second one of the opposite end sides of the measurement-objective capacitance;

the second capacitor, which is formed of two electrodes, one of which is a lower side electrode located on a lower side relative to one of the electrodes of the measurement-objective capacitance, and another one of which is located on a much lower side relative to the first lower side electrode, wherein the capacitance-type liquid-level detector apparatus judges a boundary between different species of liquids based on the equivalent value for the measurement-objective capacitance.

8. The capacitance-type liquid-level detector apparatus according to claim 7, wherein the judgment unit judges a liquid quality based on the equivalent value for the measurement-objective capacitance.

* * * * *